US011119207B2

(12) United States Patent
Vemury

(10) Patent No.: US 11,119,207 B2
(45) Date of Patent: Sep. 14, 2021

(54) CUSTOMIZED SORTING WITH WAYFINDING CAPABILITY

(71) Applicant: The Government of the United States of America, as represented by the Secretary of Homeland Security, Washington, DC (US)

(72) Inventor: Arun Vemury, North Bethesda, MD (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 16/998,481

(22) Filed: Aug. 20, 2020

(65) Prior Publication Data

US 2021/0063564 A1 Mar. 4, 2021

Related U.S. Application Data

(60) Provisional application No. 62/892,773, filed on Aug. 28, 2019.

(51) Int. Cl.
*G08B 23/00* (2006.01)
*G01S 13/88* (2006.01)
*H04W 4/029* (2018.01)
*G06Q 50/26* (2012.01)

(52) U.S. Cl.
CPC .......... *G01S 13/887* (2013.01); *G06Q 50/265* (2013.01); *H04W 4/029* (2018.02)

(58) Field of Classification Search
CPC .... G01S 13/887; H04W 4/029; G06Q 50/265

USPC ... 340/523, 517, 521, 5.6, 572.1–572.8, 600
See application file for complete search history.

(56) References Cited

U.S. PATENT DOCUMENTS

| 7,139,406 | B2* | 11/2006 | McClelland | B64F 1/368 382/100 |
| 2006/0243799 | A1* | 11/2006 | Kelly | G07C 9/257 235/384 |
| 2013/0069759 | A1* | 3/2013 | Padgett | B62B 3/1468 340/5.6 |

OTHER PUBLICATIONS

Verifiable Credentials Use Cases, W3C Working Group Note Sep. 24, 2019, https://www.w3.org/TR/2019/NOTE-vc-use-cases-20190924.

* cited by examiner

*Primary Examiner* — Tai T Nguyen
(74) *Attorney, Agent, or Firm* — Lavanya Ratnam; Kelly G. Hyndman; Robert W. Busby

(57) ABSTRACT

Customization of screening procedures based on identity information is described. In embodiments, individuals and items associated with individuals are routed based on, among other factors, identity, categorization, and threshold, such as security threshold. Wayfinding is also described for use in identity verification and physical screening of individuals and associated items. The systems, devices, techniques and approaches described herein can be used in a variety of screening situations including, but not limited to, mass transit, border security, correctional facilities, department of motor vehicles, sporting events, testing centers, and so on as understood by one of skill in the art.

21 Claims, 7 Drawing Sheets

CUSTOMIZED SORTING WITH WAYFINDING CAPABILITY

CROSS-REFERENCE TO RELATED APPLICATIONS

The application claims the benefit of U.S. Provisional Patent Application No. 62/892,773, filed Aug. 28, 2019, which is incorporated by reference herein in its entirety.

GOVERNMENT RIGHTS

This invention was made with United States Government support. The Government has certain rights in this invention.

FIELD OF THE DISCLOSURE

This application generally relates to identification of people and associated items.

BACKGROUND

Checkpoint environments, such as border and mass transit security checkpoints are complex due to a variety of factors including human and security concerns. For example, large numbers of people, and their accompanying belongings present themselves for physical screening at various times that are not controlled by the entity performing the screening, as a result the deployed resources may be unable to accommodate the demand within an acceptable time period.

SUMMARY

Customization of screening procedures based on identity information is described. In embodiments, individuals and items associated with individuals are routed based on, among other factors, identity, categorization, and threshold, such as security threshold. Wayfinding in such situations is also described for use in identity verification and physical screening of individuals and associated items. The systems, devices, techniques and approaches described herein can be used in a variety of screening situations including, but not limited to, mass transit, border security, correctional facilities, department of motor vehicles, sporting events, testing centers, and so on as understood by one of skill in the art.

In embodiments computer-readable storage media embodying computer-readable instructions that are executable by a computing system is described. In an example, the instructions are operative to respond to receipt of information and determine based on the information which category of a plurality of categories an item is to be associated. This can be done for a physical screening process to be performed in which respective categories correspond to different thresholds. The threshold can be applied in the physical screening process that is part of a transaction such as a security screening. The information for the category can be electronically communicated to an electronic device configured to direct the item responsive to receipt of the information to an area that corresponds to the category so the item is screened in the physical screening process to the threshold associated with the category.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The like numbers are used throughout the drawings to reference like features.

DETAILED DESCRIPTION

Overview

Figure 1A:
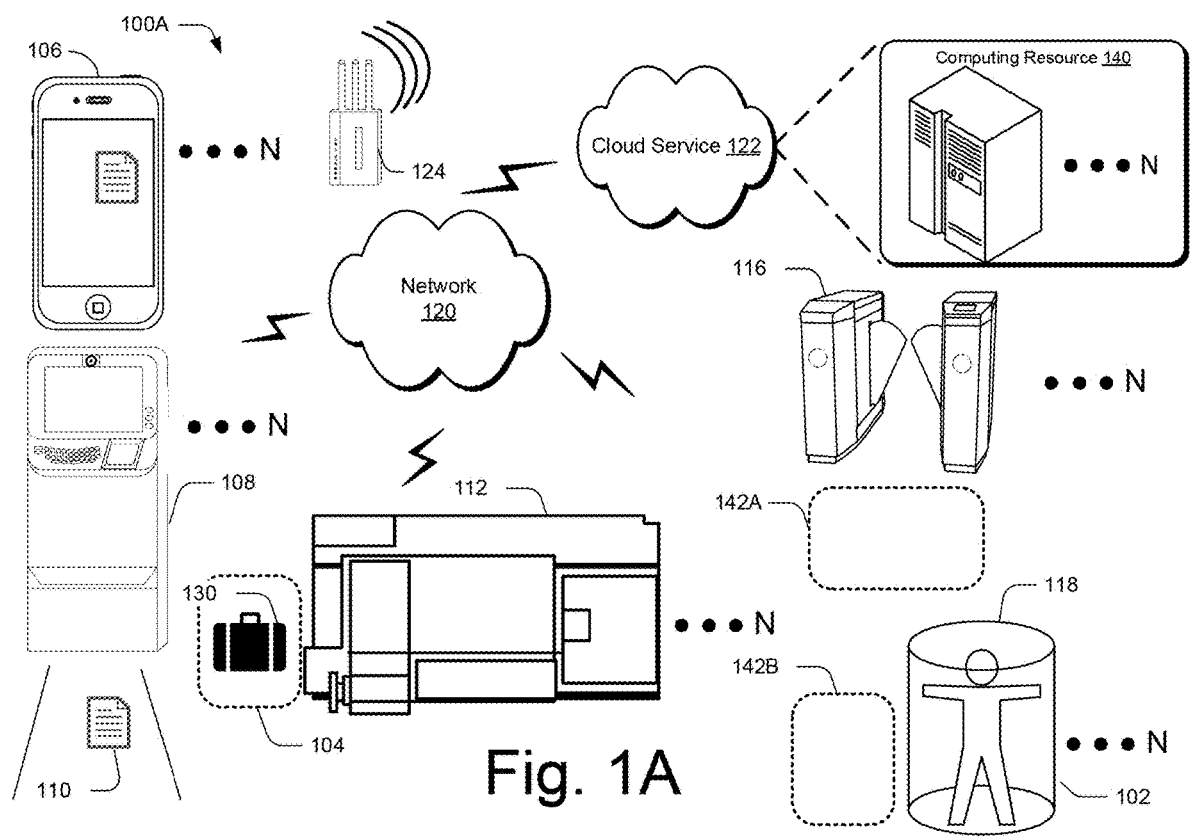
FIGS. 1A, 1B, and 1C illustrate operating environments in which the inventive principles can be employed in accordance with one or more embodiments.

Inefficiency in physical screening processes arise for a variety of reasons. These inefficiencies can result in delay, user dissatisfaction, and inefficient use of deployed resources including physical and human resources. Delay and inefficiency can be caused by more intensive screening beyond that indicated based on available information. For example, a checkpoint that implements a single intrusiveness threshold is more time consuming and resource intensive for group of individuals even though available information for individuals in the group indicates a lower threshold or application of different physical resources or screening procedures is warranted. Time and resources applied to screening individuals and items to which a lower threshold could be applied is an inefficient use of resources.

Another reason for system inefficiency is the failure to factor outcome information from one screening to another or subsequent screening that is related by, for example, a predetermined common information. Multistep screening processes often are siloed with no use of information generated from one screening process into the configuration of resources and procedures used in a subsequent screening process. For example, information garnered from examining luggage is not factored into physical screening of the individual or other individuals associated or related to that individual or luggage.

A further drawback is that multistep physical screening and resources used for this screening cannot be reconfigured or the process of reconfiguration is inefficient. This drawback, as with the other identified issues, is made more complex by limited resources including human and physical resources. For example, over the course of a day the composition of the items being screened can vary among categories indicated by the available information for individuals and other items included in the group. As a result, some individuals and their items may be screening at a higher threshold of intrusiveness than is indicated by their respective information or associated with a category to which the item belongs. This may delay the individual and waste resources.

Reconfiguring resources is challenging as the composition of the items to be physically screened may yet again change, such that the reconfigured resources (e.g., a second configuration) is inefficient relative to the composition by category of the then existing group (e.g., a second group). In some instances, it is preferable to implement an existing configuration (e.g., a first configuration) even though by category the composition of the then existing or second group indicates the second configuration would result in greater efficiency. This may be done because, for example, an anticipated third group having a particular composition by category is associated with another resource configuration. This is made more challenging as the presentation of items in a cohort may be fluid rather than being segregated into distinct boluses of items and individuals. Instead of changing from a first resource configuration to the second and then to a third, the resources can be reconfigured from the first to the third with individuals and items from the second group being handled on an ad hoc basis to make use of the resources in one or more of the first or third configurations to achieve a dampening effect.

Before discussing an example operating environment, it may be useful to understand the operation and resources associated with physical screening process used for individuals and other items for security and compliance with guidelines such as laws, rules, regulations, and so forth. Take for example a screening checkpoint at an airport 100A, an example of which may be see in FIG. 1A. Prior to arriving at the airport, an individual (e.g., a passenger) 102 may provide information about himself/herself in anticipation of travel. This data submission may occur when the individual makes travel reservations. In this instance, the individual 102 can use the Internet to obtain a ticket or authorization by placing a reservation with an airline with the use of an airline ticket reservation system supported by computing resources such as a server or other computing systems.

For example, Nicholas goes online to make a reservation with an airline to travel on December 21st to visit relatives for the holidays. In doing so, he provides or has provided on his behalf information about himself. Example information includes name (first, last, middle), frequent flier number, TSA pre-check number, passport number, driver's license number, and so forth. This information may be entered by Nicholas typing it in, or permitting it to be retrieved from pre-existing information, e.g., his frequent flier account with the airline. In doing so, he may access his account and/or permit use of the information in a variety of ways including, but not limited to, signing in with a "user name" and "password," using biometric information (e.g., fingerprint scan), or so forth.

On Nicholas' big day, he arrives at Reagan National Airport (DCA) with a checked bag (a bag which he intends the airline to handle throughout his journey) and an eponymously named "carry-on" bag 130. In this instance, Nicholas, his checked bag, and carry-on 130 are screened by the Transportation Security Administration (TSA) to promote security. Nicholas prior to or at the airport may "check-in" with the airline on which he is traveling to confirm his intent to travel, such as by selecting a seat. Nicholas like other tech-savvy individuals may do this on their mobile (smart) phones 106 although airlines and airports include touchpoints 108 (e.g., kiosk) to effectuate this check-in and perhaps print off a boarding pass 110, which functions as a token that the individual is entitled to board a plane. Although check in may be a separate process, in some examples it is tied to or effectuated by another process such as depositing a checked bag.

In examples, a bag drop station (which may include a touchpoint 108 and a mechanism to receive items that are to be handled by personnel, e.g., an automated bin or conveyor system) functions as a check in; as in some examples, this may be the first interaction between the individual (via a device typically including a graphical user interface (GUI)) and a system such as that disclosed herein. Another example system is disclosed in U.S. patent application Ser. No. 15/223,172, filed on Jul. 29, 2016, entitled Identity Verification System and Method, naming Arun Vemury, which is hereby incorporated by reference in its entirety.

In instances in which a smartphone 106 is used, the boarding pass 110 may be associated with an electronic receipt that can be output on a display included in the phone 106. Oftentimes the electronic receipt is manifest as two-dimensional barcode or Quick Response code (QR CODE, Denso Wave Inc.) although other technologies are available. Instead of using for instance an optical medium, a wireless technology can be used to communicate the information. An example is the use of near field communication (NFC) wireless technology and/or Wi-Fi to communicate information such as a unique identifier or information associated with the individual, his/her travel arrangements, or related items, which in some instances may interrelate people, e.g., Nicholas to his mother and father. If Nicholas is traveling with other individuals, as can be indicated in the reservation information described above, related data corresponding to these individuals can also be present and utilized in the processing as described herein.

For example, upon depositing a bag for a flight via a system, such as a computerized airline management system, Nicholas checks in for his flight and requests a seat according to his window preference, in this example a business class preferred status contained in his preexisting airline profile. As will be appreciated, Nicholas' checked luggage (bag) may undergo screening to determine whether it contains any prohibited items as shown in FIG. 1C. An X-ray scanner or a computer tomography (CT) device 112 may be used to screen the bag. This device in the case of a category "X" or "1" airport may be located remotely from the check in and connected by an automatic baggage handling system that directs the bag using conveyors, moving bins, and baggage sorters (electro-mechanical devices that direct luggage) to the appropriate device for screening. A variety of other electro-mechanical devices can be used for a variety of purposes in conjunction with routing items, these include sensors, sorters, conveyors, beam breaks, RFID readers, carts, electro-optical readers including, but not limited to, laser readers, scales, loaders, and so forth as understood by one of ordinary skill in the art.

As a note, luggage 130 such as Nicholas' bag, and other items may be associated or have attached a machine-readable tag that is optically readable or can communicate wirelessly using radio frequency identification (RFID), in part so it can be readily identified or located. For example, an adhesive tag with a passive RFID "chip" is attached to the handle of checked luggage bag, so it can be identified/tracked as it passes through the system and in the case of an airport on to an awaiting plane. The RFID tag may include information about the item with which it is associated and/or it may reference a record or records maintained in a computer-enabled data structure such as a computer database, e.g., an ORACLE (Oracle, Inc., Redwood Shores, Calif.) relational database. In embodiments, the database can be structured to interrelate. Other example systems/hardware include, but are not limited to, that described in U.S. Pat. No. 9,268,904 entitled, Systems and Methods for Biometric Data Management Using Relational Database Management Systems (RDBMS) which is hereby incorporated by reference in its entirety.

In the case of smaller (by passenger volume) airports, Nicholas may be directed to drop his checked bag off at a location that is near the X-ray or CT device that is adjacent to a check-in touchpoint or counter. The output of such devices like those at category "X" or "1" may be read via computer-implemented recognition system based on one or more of density recognition, shape detection, or other detection mechanism based on physical/chemical properties. This may be done automatically such as by operation of computer-implemented hardware and software that implement an algorithm to screen the item, and may culminate in or have as a penultimate result operation of an electromechanical device, such as a luggage sorter (e.g., a pneumatically or mechanically actuated pusher) that directs the offending item (e.g., luggage, bag) for rejection or additional screening although other physical results are contemplated.

In instances, Nicholas, like other individuals and his items, are screened at a predetermined threshold of intrusiveness designated not based on his profile or those of a category to which he belongs, but that of the traveling public at large. A similar situation may apply to a portion (and perhaps a large portion) of the traveling public. As such, these individuals and their associated items are screened to a higher level of security/scrutiny to accommodate others who do not enjoy that same relatively low level of security concern. Thus, more invasive, time-consuming screening procedures may be used to ensure a predetermined uniform level of security than is applicable to the particular item or category of items. This results in increased time, cost, and more invasive inspection in instances in which the individual and any items, such as articles associated with the individual, are screened to a greater degree than that applied to Nicholas on an individual basis or a category to which he belongs, e.g., "low or lower risk" items and individuals based on relevant information. Correspondingly, the attention, resources, and time utilized in these excessively intrusive inspections may be diverted from comparatively higher risks (individuals and items).

While a TSA checkpoint is described, the foregoing is generally applicable to other types of physical screening processes at, for example, border crossings (e.g., U.S. Customs and Border Protection Ports-of-Entry), concerts (perhaps looking for alcohol or a weapon), cruise ship boarding (perhaps looking alcohol), testing centers (perhaps looking for "cribbed" notes or a smartphone), and so forth. For example, if Nicholas were returning to the United States of America from a trip abroad, he would have to pass through U.S. Customs. These customs inspections may include: authentication of his identity; identification of prohibited items, such as undeclared foreign fruit, salted cured meats, raw milk cheese products, cash (at present in excess of $10,000), and so forth.

Figure 1B:
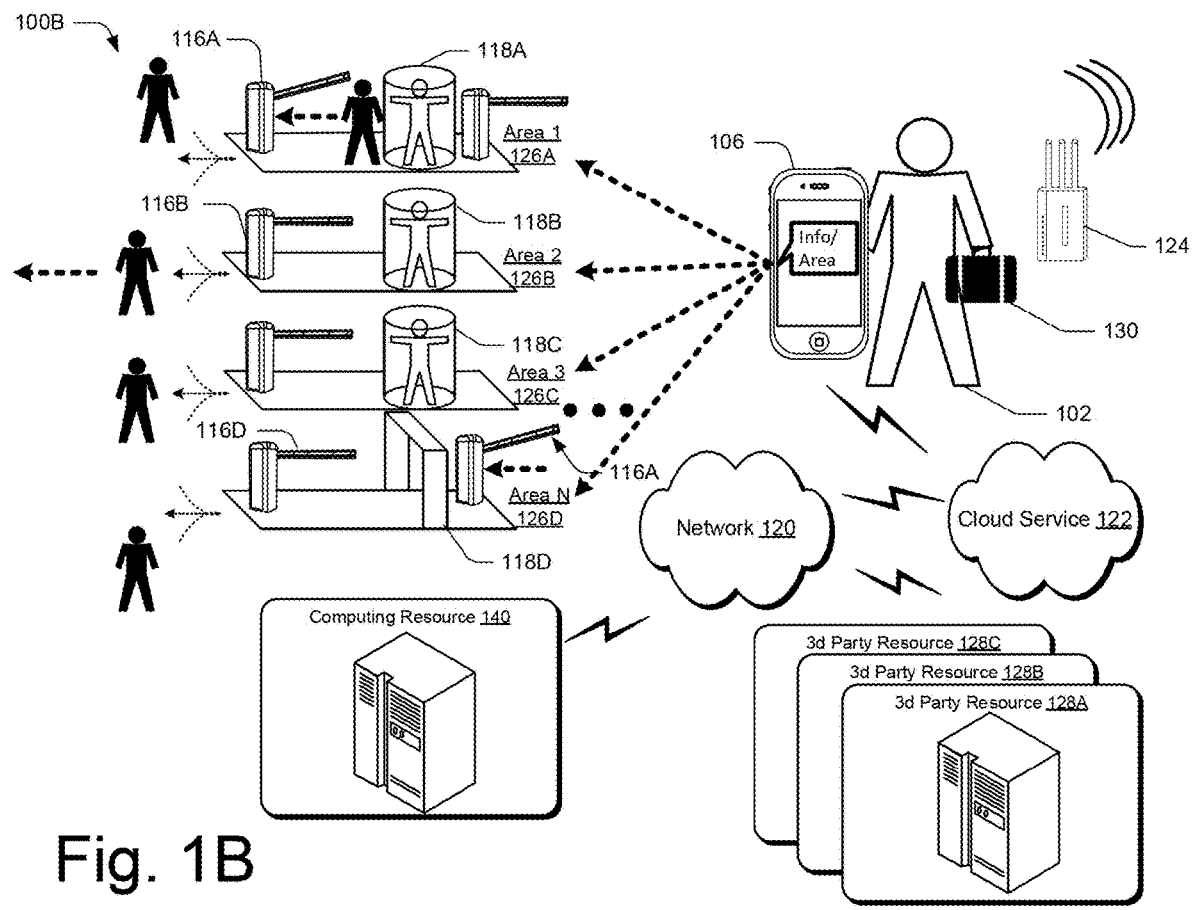
Figure 1C:
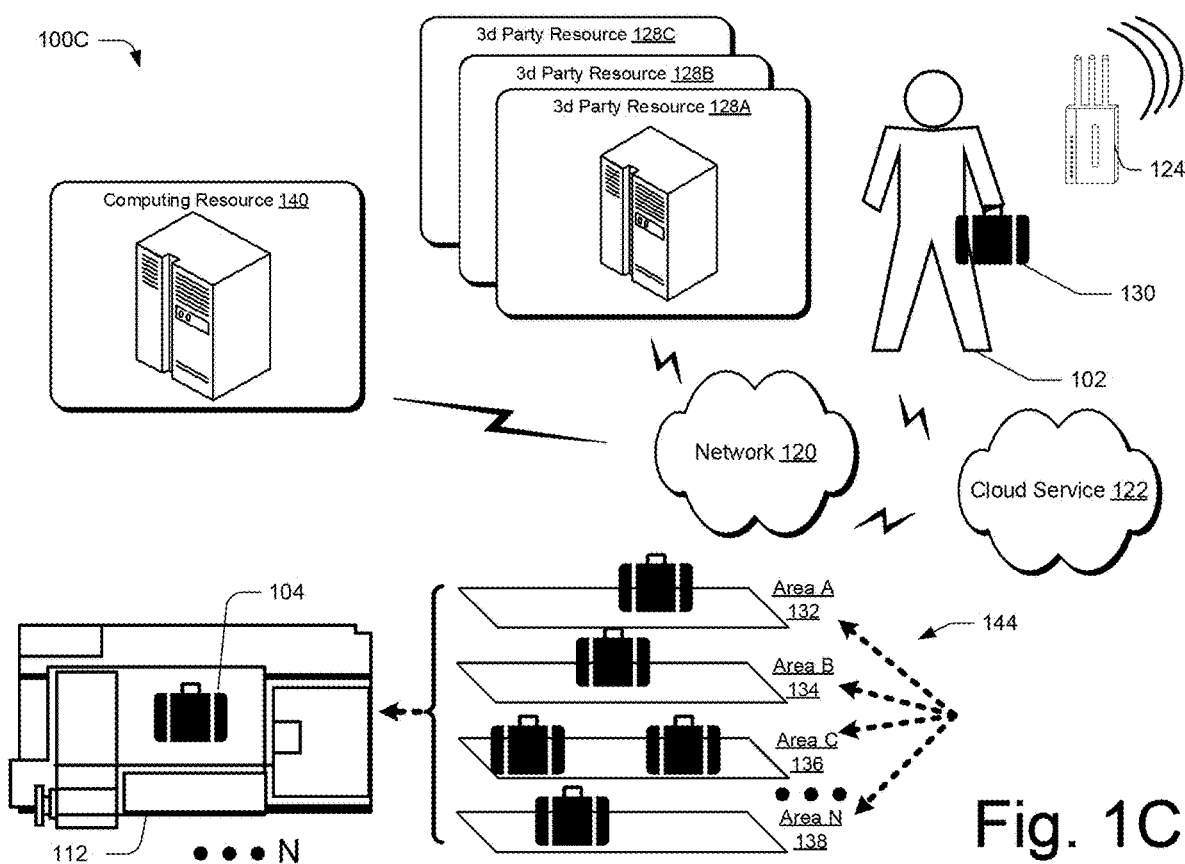

Continuing on with Nicholas' holiday trip as shown in FIG. 1B, he proceeds to primary inspection 100B after dropping his checked bag 130 that may accomplish a variety of physical screening functions. For example, a checkpoint is established to screen any carry-on items, such as small bags like briefcases, purses, overnight bags, articles carried on the individual's person, and so forth. The checkpoint may also be constructed to screen the individual himself/herself. This scanning may include any personal items carried on the individual or not deposited for check in inspection. These physical screenings (carry-on articles and individuals) can be conducted co-extensively, substantially co-extensively, or on a serial basis based on a variety of considerations as contemplated by a person of ordinary skill in the art. It is to be appreciated that this check may be the first physical screening interaction if, for example, Nicholas did not have a checked bag.

Implementing the system, method, devices, techniques, approaches, disclosed herein, information (e.g., information related to the outcome or the result of one screening process) can be used to inform another screening and the system, devices, etc. implemented to effectuate a subsequent screening. For example, in a first physical screening information related to an individual or other item to be screened can be used to determine how to route the item based on a category of the item. Thus, the person can be directed to, for example, an Advanced Inspection Technology (AIT) device that uses millimeter wave technology, for physical screening to determine if any prohibited items are present or the absence thereof. In the previous example, the category assigned to the item is associated with a threshold of the device (machine) used to conduct the screening. This can be done on a per item basis or on a categorical basis in which items in the category are associated with or poses particular one or more characteristics that are common to individual items in the category, but not shared at large among items in a group. It is to be apparent that the group may include multiple categories defined by the characteristic or predetermined categorization, e.g., high, medium, low (relative to one another). For example, an item corresponding to "low" is directed to an area, such as a luggage queuing area, or the device itself to be scanned by a CT machine operating at a predetermined threshold corresponding to low. In contrast, a "high" item is directed to an area corresponding to a CT machine operating to a higher degree of specificity relative to the "low" machine. It is to be appreciated that the devices themselves (e.g., the high and low device) may operate in the same or substantially the same manner or degree while a computer-implemented algorithm analyzing the output of the CT applies a more rigorous standard to an item scanned to a "high" or higher degree than that of a "low" or comparatively lower degree relative to the higher degree. As will be appreciated, the various device outputs and/or information derived from the various screenings can be included in or otherwise associated with a record with the individual or item in a database or other data structure for implementation in subsequent physical evaluation.

Having provided a brief narrative, the details, structures, operations and configurations of various embodiments in accordance with the present disclosure are provided. It will be appreciated that the narrative and following details are explanatory only and are provided to aid the reader in understanding the principles of this disclosure in accordance with the understanding of one of ordinary skill in the art.

Operating Environment

Referring now to FIGS. 1A, 1B, and 1C, example environments 100A, 100B, and 100C that can make use of the devices, systems, computer readable instructions, processes, approaches, and methods of the present disclosure are described. The principles of this disclosure are described in conjunction with sample environments to aid the reader understanding the technologies. The environments are not necessarily restrictive of the embodiments disclosed therewith. As illustrated, individual devices in the environment can be varied based on design preference, environmental, operational, and similar factors as contemplated by one of ordinary skill in the art.

As illustrated in FIG. 1A, the environment 100A includes one or more systems that support a variety of physical screening processes that implement devices such as electromechanical devices to perform physical screening related functions. For example, the environment is or includes a Transportation Security Administration (TSA) checkpoint, a concert security point, a test center check-in, a prison intake area, the security checkpoints for a facility (e.g., all or substantially all the security checkpoints for an airport), a Customs and Border Protection Port of Entry or so forth as understood by one of ordinary skill in the art.

As illustrated a system, such as one operating at a check in location, includes one or more of the above physical screening devices, for example, a computer tomography (CT) scanner 112, and a millimeter wave (MMW) scanner 118. The physical screen devices can include devices to direct or control individuals or items (e.g., access control devices, devices to move inanimate objects), and computing resources. In embodiments, physical screening includes identification of an individual, e.g., confirming the individual matches an asserted identity or identifying the individual using biometric characteristics. The various components forming the system (e.g., hardware supported by tangibly embodied software) can be communicatively coupled in a variety of ways (by arrangement or technology employed) by one or more communication networks (e.g., network 120) that comprise physical and/or wireless communication connections.

As described above, supporting devices include the CT scanner 112, e-gate 116, and MMW wave scanner 118, the as illustrated include an advanced inspection technology (AIT) also referred to as millimeter wave (MMW) technology, an electronic gate (e-gate) 116 which in embodiments includes biometric matching technology to identify an individual, and the scanner 112 for checked carry-on luggage 130. While these devices are mentioned, those of skill in the art will appreciate that other screening machines and technologies (e.g., a metal detector, trace chemical detector, magnetometer, identity verification devices, e-gates, mantrap, X-ray machine) can be included and operate to a variety of thresholds based at least in part on design preference and resources such as to perform the described functions.

Those of skill in the art will recognize that these and other functionally similar screening devices can be associated with devices that direct or otherwise control individuals and other items directed through a system and this may be done on available information maintained by the system or obtained from outside sources or output from, for example, a physical screening device. Example control or access devices include access control devices; "man-traps;" electronic gates or e-gates 116; electromechanical or pneumatically operated pushers or diverters; conveyors; bin machines; and so forth that are operable to direct/control movement of individuals and items. In some instances, these devices are used to route items and/or individuals through one or more processes and corresponding devices used in screening.

For example, an e-gate 116 is communicatively coupled or integrated in an AIT to control, direct, permit, stop or prevent the egress of an individual based on an outcome of the AIT scan as determined by computer-implemented automatic threat detection (ATD) software/hardware implementing a predetermined algorithm. This in some instances is done automatically, e.g., without human involvement in the device outcome determination, routing, or preventing of egress. Similar technologies and capabilities are available for handling inanimate items such as luggage, packages, and so forth. For example, a conveyor or bin system is constructed to move, direct, control, inhibit, prevent, permit movement of items through one or more screening processes supported by various devices including computer-controlled devices.

In other embodiments, an e-gate 116 directs an individual such as by moving or positioning a physical barrier, partitions, or arm(s) based on an outcome of a screening process or to direct, for example, an individual to a particular screening device based on a category to which the individual or item belongs. (This is illustrated via the e-gate in FIGS. 1A and 1B.) In an example of the former, upon determining further inspection is warranted, an e-gate directs, such as by physically blocking one or more egress paths, an individual to secondary inspection as the AIT detected an object with a predetermined shape or particular density. The e-gate may physically permit the individual to proceed or direct him/her if the AIT scan results in a positive outcome, e.g., no anomalies exist to a predetermined threshold. Conversely, an access control device can prevent a person from leaving or direct him/her if an anomaly exists, e.g., the AIT scan results in a "fail" to a predefined threshold, such as calculated by a computing resource implementing an algorithm. Although binary outcomes (e.g., "yes"/"no") are referenced, those of skill in the art will appreciate that a spectrum or range outcomes is possible, such as by judged by a computer-implemented algorithm that detects based on one or more criteria with outcomes corresponding from two to up to "N" outcomes. Such an algorithm can be supported by the cloud service in embodiments.

In another example, an e-gate 116 or other access control device under computer control routes an item based on available information maintained in a data structure by, for example, a computer system implemented for this purpose or from a third-party data resource, e.g., an airline reservation system. In an example, a user's smartphone 106 identifies, by outputting a digital representation, an area for screening queue to which the individual is directed based on his/her security vetting status and/or availability of resources. For instance, the cloud service 122 wirelessly sends the user's phone 106 a text message, provides directions or a visual representation (e.g., a map) that directs the person to a checkpoint calculated to result in a lower screening time, make use of otherwise unused resources, or for security reasons. Other wayfinding mechanisms are available as well and the system can include position location devices (e.g., wireless beacons) or native positioning technologies (global positioning system (GPS)).

As should be appreciated from the examples, the system may include devices owned/operated by individuals that use the system and these devices may communicate using (typically) different cellular or wireless communication technologies supported by appropriate hardware/software. These devices may join, drop, and participate in the system based on various use cases and can be included or excluded from the system in a transitory manner.

In some embodiments, an c-gate 116 includes or is associated with technology (such as by communicatively coupling one or more devices either directly or indirectly) used to capture biographic/biometric information, such as may be included in an identification portion of a screening process. For example, an access control device includes a biometric/biographic information collection device supported by hardware/software. Although use of biometric collection devices, such as a kiosk having this capability is discussed throughout this document, in embodiments, a mobile device (e.g., a BYOD (bring your own device) smartphone) includes biometric information collection capability with appropriate security to ensure the integrity of the information. In this example, the access control device includes one or more image capture devices, readers (e.g., a barcode reader, a radio frequency identification (RFID) reader, a BLUETOOTH (Bluetooth SIG, Kirkland, Wash.) transceiver), (one or more of still image or video image) to capture user biometric and/or biographic information (such as if a token like a passport, identification document, or driver's license is used). Thus, an e-gate 116 can be configured to electronically read a user's driver's license by using a RFID receiver to obtain information (e.g., biographic/biometric/security information such as a digital signature). This information can come from memory included in a chip in the driver's license or a smartphone including digital identity information (e.g., a mobile driver's license) and/or accessed from a data structure such as through use of a machine-readable barcode or other technology such as wireless communication. In other instances, an image capture device (e.g., an optical image capture device) may obtain the information from that printed or otherwise embedded in an identification document. As is to be apparent the optical image capture device may use different frequencies of energy to capture the physically presented information in addition to indicia that indicates the authenticity or validity of the card or document, e.g., capture a holograph, ultraviolet printing, micro printing and the like as recognized by one of skill in the art for physically securing the card or document.

In the case of the biometric information, an image capture device included in or associated with the c-gate 116 may obtain an image for use in 1:1 algorithm matching with the individual asserting the identity represented by the driver's license. Example image capture devices are operational to capture one or more images of an individual's fingerprint, facial features, iris, or the like that are usable to uniquely identify the individual from which the information was contained.

In a tokenless identity scenario, an e-gate 116 may function by, for example, comparing captured biometric information or information derived from captured information to a gallery of corresponding reference information, e.g., 1:N identification. For example, an e-gate is configured to compare one or more of a captured facial, iris or fingerprint or a hash thereof to a gallery of anticipated travelers, such as based on a passenger manifest. This matching process, like other biometric matching/identification discussed in this document, can be done on a single or multi-modal basis through use of (for example) a computing resource with an algorithm that calculates whether in-question data (e.g., an image) matches reference data (e.g., an image in a reference gallery).

Similar technologies to that of the e-gate 116 or the physical screening scanners 118A-118D (including but not limited to bring your own device (BYOD) scanners, e.g., smartphone) may be used based on the particular situation and operation parameters and so forth as understood by one of ordinary skill in the art. The foregoing considerations include, but are not limited to, the availability and use of, for example, a virtual private network (e.g., Internet "tunneling"), encryption, or the like. The screening processes and supporting devices may be associated on an individual basis with a predetermined threshold of intrusiveness related to a category of individuals and/or other items to be screened. In this way, a device, a combination of devices, or system of devices performing physical screening processes can implement a customized or semi-customized threshold across a group.

Computing resource 140 is representative of a combination of hardware and/or software to generally manage/coordinate operation of the various devices under its control, e.g., devices forming a checkpoint. Some of the computing functionality as illustrated is provided as a cloud service 122 (e.g., a localized cloud service to a checkpoint or facility) which is virtualized from, for example, the computing resource. In the illustration, for ease of understanding, the cloud service 122 is supported by one or more computing resources, such as servers that are constructed/configured to support the described functionality. Those of skill in the art will appreciate that the illustration is representative of example embodiments; other components and arrangements are possible as understood by one of skill in the art and the capabilities of the components that form the system. In embodiments, the physical resources (hardware, software) or the functions described as performed by the cloud resource are provided in a distributed manner, such as making use of computing resources associated with or in the devices themselves to manage operation of the collective group of devices, such as those forming a checkpoint.

The capability of the cloud service 122 in this, and other embodiments, is supported by computing resources, such as a server or cloud service that implements one or more computer-enabled algorithms to route individuals and other items through one or more physical screening processes. The cloud service 122 (in this case) manages the system/its components to optimize or substantially optimize the available resources, for example, to minimize average user time while meeting applicable security thresholds. The server or cloud service is localized (e.g., support multiple checkpoints in an airport or geographic region) in embodiments to promote efficiency, minimize communication delay, and so forth as recognized by one of ordinary skill in the art and based on the relevant resources.

Such algorithms can implement a variety of approaches as part of determining routing, resource usage based on a variety of constraints such as security threshold, time and so forth impacting physical screening process efficiency, timing, resource allocation, and the like as recognized by a person of ordinary skill in the art. Example algorithms may use a variety and combinations of approaches/techniques for optimizing resource efficiency including, but not limited to, first-come-first-served, round-robin, heuristic approaches, best-trade-off, weighted average, swarm intelligence, and so forth, for example, to load balance individuals/items to be screened with available resources based on a variety of constraints, language capability, gender, age, physical parameters, risk category, and so on. In embodiments, a computing resource such as a server or cloud service implement information from a variety of data sources as part of its calculation that forms the basis of its routing decision. For example, initially a system calculates and routes a passenger to a particular bag drop (and corresponding threshold) based on historical information provided by a user (e.g., via a smartphone) or an airline information system on the user's behalf or from a resource that maintains historical information based on previously provided or discerned information, e.g., previous screenings. Those of skill in the art will appreciate that in addition to information related to the individual/item, a computing resource making such a determination can be programmed to account for factors such as resource availability; workload including, but not limited to, anticipated workload, and so forth impacting the various processes, and computing resource allocation.

In embodiments, a computing resource 140 (e.g., a cloud service 122) can dynamically change a threshold implemented by the system or one or more individual devices in the system. Dynamic thresholding can be done on an individual basis or on other information such as operational criteria associated with one or more of the checkpoints; a group of devices configured to operate together (e.g., a security "lane"); based on a facility (e.g., a port of entry); or on regional or national criterion. Such a dynamic thresholding for individuals and items permits efficient processing of items in a least intrusive manner utilizing only appropriate resources based on the criteria while maintaining at least a minimally acceptable level of security associated with a determined category for each individual and item. As is to be apparent due to time constraints, complexity, screening volume, and so forth, dynamic thresholding is performed by implementing an appropriately configured computer resource that, based on the output of the various components included in the system, makes a calculation (perhaps iteratively so) as to a threshold that is to be applied by the various devices, e.g., screening devices, computer resources in the system, so it applies the applicable threshold.

The particular physical screening device and corresponding threshold is implemented under computer control for a particular screening based on available information, such as biographic information related to one or more individuals or items associated with the individuals. As will be explained further, while a first or initial screening process in some instances is solely based on historic information such as a preexisting determination, in embodiments information output from one screening process is used as a basis (or at least a partial basis) for determining a category for a subsequent screening process to tailor a device's threshold to avoid one or more of an overly burdensome threshold, an unduly low threshold or misapplication of a threshold relative to relevant information. In some examples this is done in a manner that obfuscates what is occurring (e.g., variation in device threshold level) to promote security. For example, instead of statically assigning devices a high, medium, low threshold, a system under computer control directs individuals to various devices so it is not apparent or readily apparent what level of scrutiny is implemented by a particular device. This can be accomplished in a variety of ways including, but not limited to, text messaging, in app map routing, outputting a signal to an access control device, outputting information via a graphical user interface (GUI) on a display to personnel working with the system and so forth.

In an example, a first AIT (AITs are illustrated as items 118A-118C) is associated with a threshold that is higher than a second AIT that operates at another (lower) threshold. This may apply through "N" number of the same or functionally similar devices, although those of skill in the art will appreciate that some of the devices belonging to the class (e.g., AIT) may implement the same or substantially similar thresholds (customized or semi-customized thresholds). These thresholds can change under computer control based on a variety of factors as defined by a variety of parameters associated with hardware/software implemented in conjunction with the system.

For example, as illustrated in FIG. 1B, the illustrated system routes Nicholas to area "N" associated with a magnetometer 118D based on his low risk vetting status as determined by the cloud service 122 and/or the availability of resource, e.g., the magnetometer 118D has a short line or is not being used. As illustrated, a physical access control, such as an e-gate 116A opens based on a determination by the cloud service 122 that Nicholas indeed is associated with an admirable "low risk" identity. In some examples, the e-gate opens automatically based on the presence of Nicholas' phone 106 approaching or adjacent to the e-gate. For example, having previously established through 1:1 biometric matching that Nicholas 102 is associated with a particular smartphone 106 during an identification screening process, the smartphone 106 and the e-gate 116A communicate (either directly or via cloud service) so the e-gate opens responsive to the location of Nicholas/his phone. Those of skill in the art will appreciate that the order and combination of screening process may vary based on a variety of criteria and may do so on an individual basis.

For example, one user's first interaction is with a personal screening device (e.g., AIT) while another's is with a screening device for an item associated with the individual, e.g., a CT scanner for checked luggage. In embodiments, an overall system, such as one for a collection of screening related devices is configured to account for variation in process, so in the former case historical information is used as the sole basis for determining what category and correspondingly what threshold to which the individual belongs. In the latter case (presuming the individual proceeds to personal screening after the CT), the algorithm implemented by the cloud service 122 factors the outcome of the CT screening as part of determining to which area or AIT (implementing a particular threshold) the individual is to be directed. Thus, the output of the CT may be used as a factor (such as a weighted-factor) in cloud service/algorithm calculation to determine what AIT is to be applied by an optimization algorithm routing individuals/items through the various devices. Other algorithms can use different approaches for this determination, e.g., heuristics, artificial intelligence, deep-learning artificial intelligence.

In other examples, a particular outcome (e.g., fail, anomaly detected) dictates a particular threshold as calculated by the algorithm for a subsequent screening process, e.g., an "if then" decision is calculated based on the occurrence of or responsive to an event or set of conditions. In situations such as this, the algorithm routes an individual to a personal screening device based at least in part, if not solely, on the output of a previous screening process. As should be apparent, a computer resource doing this by implementing a routing algorithm that calculates a route based on a variety of factors that then is electronically communicated to, for example, the individual's smartphone that may render the routing in a display as a map, a set of logical instructions, and so forth. Computing tasks can be allocated between the computing resources in the system and/or the individual's smartphone in embodiments.

The respective devices can be reconfigured on a dynamic basis to implement other thresholds based on factors including analytically predicted factors based on historical or artificial intelligence (AI) determined predictive analytics. In contrast, another person, "Owen," in a similar circumstance may be routed to an AIT operating at a "medium" threshold based at least partially on his vetting status or lack thereof, e.g., this is a first encounter with mass transit screening.

For example, while three CT scanners 118A-118C operate at comparatively "high," "medium," and "low" the CT scanners may be constructed to function and/or capable of functioning within the entire range of available thresholds or a subset thereof. In this way, as the demand based on categories changes, a system implementing the devices or combinations of devices can dynamically reconfigure to accommodate demand to maintain a predetermined throughput, such as average screening time. This can be done automatically based on the individuals/items that are to undergo the screening process. Although high, medium, and low thresholds (relative to one another) are discussed, it is to be apparent that the devices, systems and methods can implement any number of different thresholds (e.g., through "N" levels) in conjunction with this disclosure and the threshold can change based on design preference and so forth as recognized by one of ordinary skill in the art. While substantially similar devices (CT scanners) are mentioned, those of skill in the art will appreciate that functionally similar technologies can be implemented X-ray backscatter, magnetic detection, and so forth.

For example, a magnetometer is implemented to scan individuals for objects that generate magnetic anomalies, such as weapons for someone associated with a low category or threshold, while an individual associated with a higher level is directed, such as by an automatic e-gate to an area associated AIT that operates to a higher level of scrutiny relative to the magnetometer.

Referring now to FIG. 1B, an individual, such as Nicholas, arriving at an airport can be located and/or identified (both based on device settings) via his smartphone 106. This can be done using a variety of technologies and approaches, such by geolocation using a global positioning system (GPS) functionality included in his smartphone (e.g., a GPS transceiver), beacon technology (e.g., BLUETOOTH, Wi-Fi), radio frequency identification technology (RFID), NFC technology, Wi-Fi beacon technology that in some instances in addition to locating Nicholas via his phone can be used to provide information such as location aware information and so forth as understood by one of ordinary skill in the art. An example of the latter is the system providing Nicholas with wayfinding and other information about his travel status, checkpoint information, or advertisements on his phone. This may be done using a variety of approaches such as text messaging, providing visual cues (a map or step-by-step instructions) in an application. Example systems/hardware include, but are not limited to, that described in U.S. patent application Ser. No. 16/150,690 entitled, Information Collection Using Multiple Devices, filed on Oct. 3, 2018, naming Arun Vemury which is hereby incorporated by reference in its entirety. Example commercial providers of geo-location technologies/beacon systems include but are not limited to Beacon Micro, LLC (St. Louis, Mo.); Bluvision, Inc. (Fort Lauderdale, Fla.); and Cisco Systems, Inc. (San Jose, Calif.).

In embodiments, Nicholas checks in or makes a system of the present disclosure aware of his presence through use of his smartphone 106 or a touchpoint (illustrated as a kiosk in FIG. 1A), such as one operated by an airline, an airport authority, or a government entity, such as the U.S. Transportation Security Administration (TSA).

In the current example, Nicholas could do this (presuming he has previously or currently configured his smartphone to do so) to make the system aware of the location of his phone/him and permitted it to provide information, such as biographic information, e.g., name, date of birth, unique identifier (e.g., driver's license number, concatenated name date of birth), passport number, airline frequently flier number, redress number, known traveler number, boarding pass number or machine readable information (e.g., 2D barcode), redress number, address, or the like. In embodiments, this information includes information associated with his contemporaneous travel plans (his upcoming flight) and/or historic information such as previous travel information.

Electronic communication of this information can be done automatically by Nicholas' smartphone performing a handshake procedure with the cloud service 122 via a wireless beacon (hereinafter "beacon") 124, e.g., a wireless router with beacon capability. In other examples, based on design preference and device settings a user may have to manually authorize communication/establishing of a communication link. This can be done through use of biometric identification (fingerprint, voice print, facial image, iris image, vein pattern); use of a personal identification number or password; challenge/knowledge questions; or simply constructing a graphical user interface (GUI) output on a display included on the smartphone to display a button that is useable to cause the smartphone to submit or communicate the information via one or more of a wireless (Wi-Fi) communication, limited range wireless communication, BLUETOOTH (Bluetooth SIG, Kirkland, Wash.) communication, cellular communication, or the like as understood by one of ordinary skill in the art for electronically communicating information.

Referring now to FIG. 1C, an example is provided to aid understanding the principles of this disclosure. This description is provided to aid understanding and is not restrictive. Upon arriving at an airport, a passenger such as Nicholas may have in his/her possession a mobile computing device, e.g., a smartphone 106. Upon arriving at a predetermined location such as within Wi-Fi beacon range (presuming the smartphone is enabled and has suitable hardware/software (e.g., an "app") the smartphone 106 communicates with the beacon 124 to establish its presence, e.g., identify itself to the beacon 124. This may be done in a variety of ways such as the smartphone signaling the beacon 124 upon it identifying the existence of wireless radio signal from the beacon. In another example, the beacon 124 polls (e.g., "calls out") to mobile-enabled devices to signal the beacon's availability for communication.

In some instances, the devices perform an electronic handshake to establish a communication channel that permits bi-directional communication. Depending on design/user preference, the smartphone 106 can provide location information generated within applications on the smartphone to other devices 44, (e.g., e-gate 116 of FIG. 1A) and computing resources 140. Depending upon the operation of these applications during the handshake, the smartphone 106 may provide biometric information regarding the traveler. For example, the smartphone 106 obtains fingerprint information from the traveler, face identification information, and similar information to confirm the traveler is a known party in possession of the smartphone 106 while the above communication occurs. In another example, a computing resource within the system matches traveler identity information with other identifying information to dynamically set a threshold associated with a level of inspection that is to be applied.

The computing resource 140 can determine, by application of a computer-implemented algorithm, and assign one of a plurality of areas 132-138 (illustrated as areas A-N). These areas can correspond to screening and other devices, such as luggage sorting system, included in the system. In embodiments, the computing resource/cloud service communicates information about the area to which the item or individual is to go. The computing resource 140 is communicatively coupled to the system components within the predetermined location by a communication network 120. In the illustrated example, the smartphone 106 is communicating with the network 120 via local Wi-Fi, although in alternate examples the smartphone 106 can establish communication with the network 120 via a cellular connection to a telecommunications provider. A cloud-based service such as that of cloud service 122 can provide the functionality of the various systems and resources.

In addition to the system, external or third-party resources 128A-128C are illustrated in FIG. 1B as being communicatively coupled to the computing resource 140. The third-party resource 128A-128C (shown as servers) are illustrative of functionality/resources of information that are available to a central resource that will be discussed later in this document. Third-party resources 128A-128C can be associated with different levels of trust, e.g., trusted, not trusted, partially trusted, trusted with respect to one or more types or kinds of information or the like. In an example embodiment, the computing resource 140 communicates (electronically) with the third-party resource 128A-128C to obtain information about an item that is to undergo a physical screening process, such as an individual or bag.

Example third-party resources 128A-128C include computing systems owned, operated, and/or maintained by entities that provide or exchange information with systems in accordance with the present disclosure. Example third-party resources 128A-128C include a flight information system for an airline, a passport database operated by a government of a foreign country, an airport authority flight manifest system, a cargo line information system, a state law enforcement database, a tribal information system, a test entity, a mobile telephone service provider, and so forth.

In some embodiments, electronic communications (whether wired or wireless) between the electronic devices and the third-party resource 128A-128C occur with the computing resource 140 or are routed through the computing resource 140 to minimize the risk of unauthorized access or activity. In additional embodiments, the computing resource 140 is configured to obtain predetermined types of information, e.g., travel information, driving record information, social media information, criminal record information, medical information, and so forth based on design preference. While this may be accomplished in a variety of ways, in embodiments the computing resource is programed to communicate a request to third party resources for information that corresponds to items/individuals that are anticipated (e.g., registered) to appear for screening.

In examples, the computing resource or a central resource (computing) electronically places such a request to the third-party computing system with which it has a preexisting relationship (e.g., user name, password, authentication protocol, data protection scheme (such as common encryption methodology)). This request may include a unique identifier that is used by the computing resource when the third-party computing system provides responsive information. In examples, this unique identifier is not used by the third-party system, e.g., is not meaningful or not used as basis for identifying responsive information maintained in a data structure maintained in conjunction with the third-party computing system. For example, the computing resource provides an automatically generated unique identifier with a request for information to the third-party system even though the third-party system is "unaware" or does not make meaningful use of the unique identifier. In instances, this is done so when the third-party resource provides the requested data, it returns the unique identifier, so the computing resource can match the returned data to the corresponding data record or electronic request for information.

The computing resource 140 may be prohibited from obtaining/receiving/implementing predetermined types of information, sources, and so forth for a variety of reasons, including but not limited to cyber security. For example, the computing resource 140 includes software that inspects received information for malicious executable code, information types (e.g., image files) or other predetermined types of information corresponding to potential threats. In another example, the computing resource 140 can screen/vet received information, such as to determine if it is well formed or complies with predetermined rules maintained in for instance a registry of rules that the computing resource uses for compliance purposes.

Referring again to FIG. 1B, the plurality of areas 126A-126D may be associated with, for example, a geographic location such as an airport, a testing location, department of motor vehicles, or border checkpoint where one or more individuals and/or items such as travelers and luggage are presented for a physical screening process in which information is implemented to determine which category and corresponding dynamic threshold is to be applied during the physical screening process. Multiple areas 1-N 126A-126D are illustrated, and a given area can involve a different threshold of screening process to be applied. In some embodiments, an area (e.g., Area "1" 126A) is referred to as a predetermined geographic location corresponding to an area designated in an electronic manner, such as through electronic "fencing" that uses global positioning system (GPS) and/or electronic beacon technology (e.g., wireless beacons), which are used to define whether a given location of the mobile device 106, e.g., smartphone, falls within the predetermined geographic location corresponding to the given area. In some embodiments, a predetermined location corresponds to a building, a space (e.g., a room or area) within a building, an outdoor area bounded by a fence, and the like. While the above example in FIG. 1B illustrates a screening process applied to an individual, an identical process, illustrated in FIG. 1C, can utilize the same dynamic threshold level (Low, Medium, High) above used for travelers applied to the traveler's checked and carry-on luggage. Devices in or associated with different areas can scan the traveler's items differently depending upon the level of threat determined appropriate for the traveler.

Referring again to FIG. 1C, in the illustrated embodiment the smartphones are used to direct the item, e.g., an individual in possession of his/her smartphone, to a given area A-D 132-138 to undergo a physical screening process to a threshold corresponding to that given area.

The environment can include one or more beacons 124 (such as those compatible with 802.11 wireless local area network or BLUETOOTH standards promulgated respectively by the Institute of Electrical and Electronics Engineers (IEEE), New York, N.Y., or (Bluetooth SIG, Kirkland, Wash.) for identifying that a device (a smartphone, tablet, etc.) within the local environment 100A-100C. The beacons 124 in embodiments are constructed to provide additional functions, e.g., function as wireless (Wi-Fi) routers for general or dedicated uses to provide information for screening, alerts, routing instructions, etc. It is to be understood that various components within the system can be varied, structures substituted in place of or in addition to those described. While geolocation via radio type signals is discussed, the system can employ global position system (GPS) technology to provide substantially the same functionality, such as through use of included GPS positioning hardware/software in the smartphone and/or the mobile communication service provider. Example commercial providers of geo-location technologies/beacon systems include, but are not limited to, Beacon Micro, LLC (St. Louis, Mo.); Bluvision, Inc. (Fort Lauderdale, Fla.); and Cisco Systems, Inc. (San Jose, Calif.).

Other technologies can be used in conjunction with a system and devices of the present disclosure to locate a mobile device 106 within the local environment and relative to the various areas, e.g., triangulation of the device's location. In an example, a traveler uses a radio frequency identification (RFID) reader (such as by placing his/her electronic passport containing an RFID chip) to identify that he/she is present within the local environment 200 and/or to supply information to the system 200. In the previous example, the passport functions as a token of the individual.

In some instances, the individual's location is authoritatively or at least partially authoritatively established by obtaining information (such as a PIN or other information likely known only to a particular individual, e.g., challenge questions) via the device that is affirmatively identified through geo-location to be at the environment. For example, a smartphone is used to ask a traveler to input a PIN or provide responses to knowledge questions to establish and/or confirm that the traveler is accessing the portable device that is determined to be within the local environment. In the previous example, the system, e.g., the computing resource 140, can establish that the smartphone 106 is present in the environment, and that an individual that is aware of an associated PIN is likewise present.

Referring again to FIG. 1B, in examples, an overall environment of the primary inspection 100B may comprise multiple predetermined areas 126A-126D supported by a computing resource 140 that is geographically co-located or arranged/configured to promote efficient operation of the system/devices within the local environment relative to other resources in the system based on operational parameters. For instance, a server and corresponding communication resources and so on are established at an airport to facilitate efficient communication, information access, and so forth. Embodiments are also contemplated in which the system implements multiple computing resources, e.g., servers dedicated to portions of a predetermined environment such as a particular terminal in an airport. In some embodiments, the functionality associated with the computing resource 140 is provided in a distributed manner, such as in a cloud or virtual type configuration.

In embodiments, systems, devices, methods, and approaches associated with the plurality of areas are constructed to be part of one or more physical screening processes. Example physical screening processes include border control screening, transportation screening, testing, licensing, and so on. The local environment including the plurality of areas 126A-126D can be an airport, a port of entry (which may be at an airport, a sea port, or land) operated by U.S. Customs and Border Protection (CBP), a checkpoint such as a Transportation Security Administration Security (TSA) checkpoint, a test facility, a department of motor vehicles location, or the like. In such instances, the hardware, software, processes and methods may be configured to accommodate requirements of such physical screening processes. The methods, procedures, and techniques implemented by the systems, devices, and/or components can be based on or at least partially based on a category and/or threshold corresponding to the item and associated with a level of scrutiny the item will undergo in the physical screening process.

The use of areas 1-N 126A-126D and areas A-D 132-138 permits respective areas to contain different personnel and electronic devices as needed to implement an assigned level of inspection (to a particular level of intrusiveness) applied as individuals and items are processed. These different resources include the scanning devices themselves, thus allowing a mix of devices that matches the individual's and items' required level of inspection and allowing for a more efficient utilization of difference resources relative to applying a ubiquitous level. These different resources may include operators and staff possessing different skills and training as needed.

As illustrated in FIG. 1C, the local environment 100C includes a baggage sorting system 144 communicatively coupled by a network 120 to cloud service 122 and computing resource 140, which can be located at a predetermined area, e.g., port of entry, a Transportation Security Administration (TSA) checkpoint, checkpoints for a particular terminal, an airport, and so on. The baggage sorting system 144 can utilize CT scanner 112 that is configured to implement dynamic thresholding discussed above to the traveler's luggage 104.

Figure 2A:
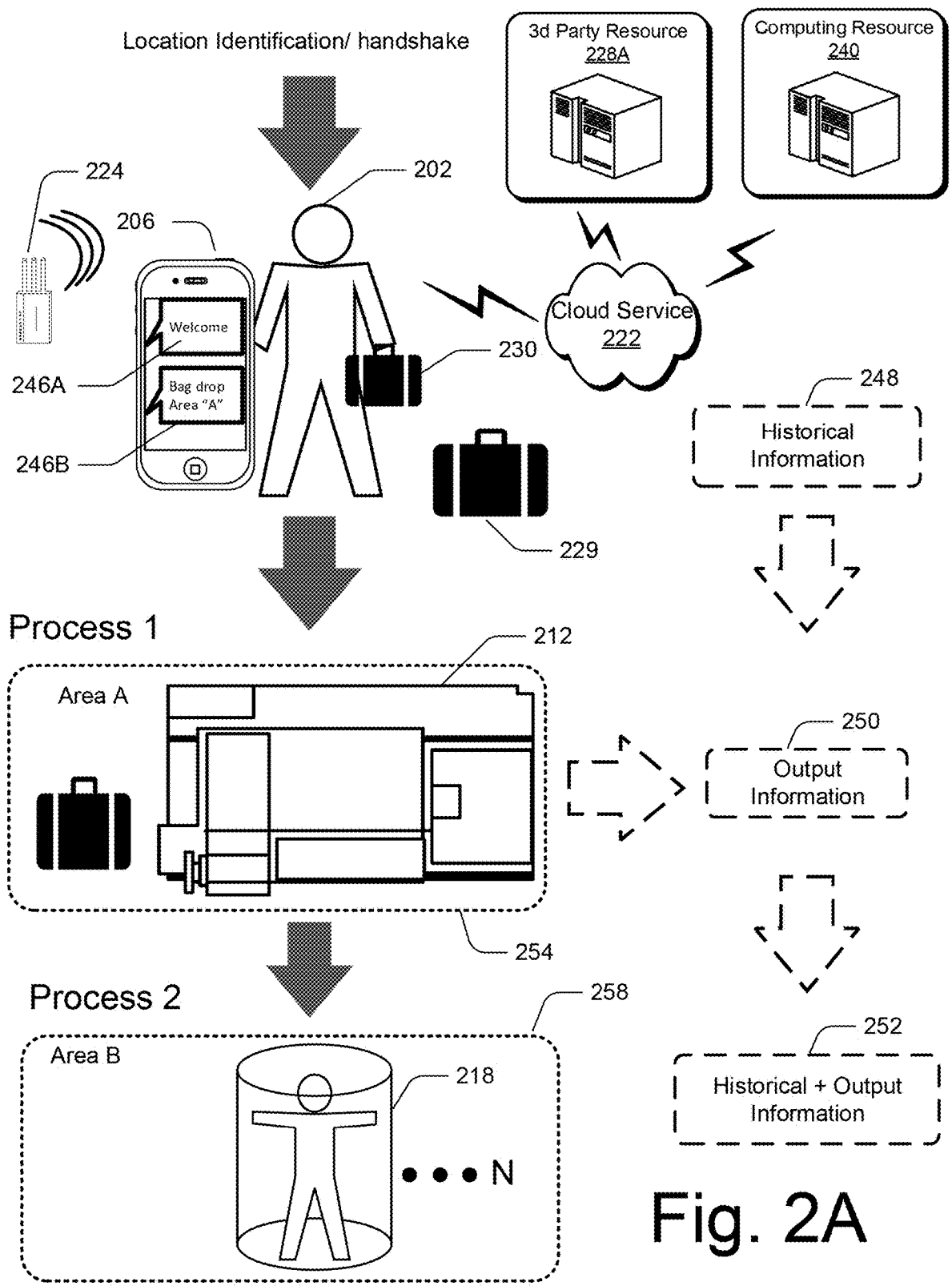
FIG. 2A illustrates one example embodiment of a traveler being processed through a security checkpoint according to the present invention.

FIG. 2A illustrates an embodiment of a traveler being processed through a security checkpoint according to the present disclosure. In this example, a traveler 202, arrives at an airport to begin a trip. As discussed above, he can check in for his flight using a smartphone 206 which performs an identification of the traveler using biometric information received by the smartphone. The smartphone 206 obtains its geolocation as discussed above and communicates with the computing resource 240 while performing the electronic handshake of FIG. 1B. The traveler 202 as illustrated arrive with a piece of checked luggage 230 as well as a carry-on bag 229 that accompanies him onto the aircraft in the passenger compartment.

As illustrated, upon completion of the location identification handshake with the smartphone 206, the cloud service 222 transmits a welcome message 246A to the traveler's smartphone 206 indicating the completion of the electronic handshake. Computing resource 240, such as the one illustrated as supporting a localized cloud service, can also retrieve historical information 248 associated with the traveler 202 previously obtained and stored for use. Example historical information 248 includes known information regarding the traveler 202, such as biographic information, e.g., name, date of birth, unique identifier (driver's license number), passport number, airline frequently flier number, redress number, known traveler number, reservation number and associated data including date, time, method of establishing the reservation and payment method, boarding pass number or machine readable information (e.g., 2D barcode), redress number, address, or the like. In embodiments, this information includes his contemporaneous travel plans (his upcoming flight) and/or historic information associated with his asserted identity. The information can also identify associated individuals, e.g., those in his traveling party. The computing resource or cloud service can access similar information traveling companion from, for example, a data structure associated with one or more of the computing resource 240, a central computing resource, cloud service or third-party computing resources 228A.

The cloud service 222, for example, determines to which category the traveler and his associated items belong by calculating a risk score corresponding to a category that indicates an extent to which a physical screening processes will be applied. For example, the cloud service 222 implements an algorithm to weighted score whether the traveler belongs to one of a low, medium, or high category based on available historic and/or collected information (if for example a previous physical screening has occurred). For example, a computer algorithm assigns a risk score based on various factors indicated in the available data and then weighs the individual item scores based on the extent to which each item is indicative of the category to which the individual or item belongs. For instance, a traveler with a history of numerous screening without any derogatory indications may receive a score that places him/her or associated items in a low category while an individual with no travel history is assigned a medium category. While the computer-implemented algorithm may use other factors in calculating the score, solely for the sake of example only, past travel history may be indicative of which category the computing resource should assign. It is to be apparent that other computing resources within the system may be constructed to have this capability, e.g., cloud service, a central resource, computing resources included within devices such as e-gates. As discussed above, an example set of category values correspond to a Low, Medium, and High. Of course, the computing resources in such a system could implement any number of categories to distinguish various levels of intrusiveness that are applied by devices as part of physical screening or as part of procedures implemented to conduct screening (albeit perhaps with the same, substantially the same, or similar goals).

As also illustrated, cloud service 222 transmits a second message 246B to smartphone 206 directing its user to drop off location 254 (labeled Area "A") for checked luggage 229 if he has checked luggage. The second message 246B may contain directions to the drop off location 254 displayed in a map output on a display included in the smartphone. The drop off location 254 corresponds in this instance to a scanning device (e.g., CT scanner) corresponding to a category with the determined threshold for his luggage 229 based on the algorithm's calculation. Although the category for the luggage likely will be the same or similar to that the cloud service 22 assigns to traveler himself, it should be recognized that it may differ based on available information. For example, the cloud service 222 assign four pieces of checked luggage a "high" category because the corresponding individual is making a one-day trip, while another similarly situated individual making a two-week trip with four pieces of luggage may rate a "medium" category and receive less invasive screening.

In embodiments, the computing resource 240 transmits to the applicable device (in this case a CT scanner for luggage) an applicable threshold to be applied, e.g., instructions to set physical or software limits (e.g., detection level of automatic threat detections software). This may be done for each physical screening that is to occur, substantially all physical screenings that are to occur, when a device is to change operating parameters (e.g., when a threshold is to change for a device) and the like. The foregoing communication may occur at various times which include, but are not limited to: in response to a determination, responsive to communication of information indicating the individual or item is ready to be screened, e.g., an e-gate scanning the traveler's driver's license. For example, due to an influx of low category items to be scanned, the cloud resource communicates instructions that are used to change an operating parameter of a screening device. Examples of the foregoing include increasing the device's sensitivity or other setting, implementing an algorithm that increases security, or the like as understood by one of skill in the art. In another example, a cloud service, or the device itself under control of the cloud service, sets a device threshold in response to geolocation of a mobile device within a predetermined area adjacent the device. The device which is to change its operating parameter can be configured to do so responsive to the communication; at a later time (e.g., after two minutes); or upon occurrence of an event, e.g., scanning a mobile driver's license on smartphone 106 or an RFID included in a tag or label associated with an item like luggage or a package.

In an embodiment, responsive to the traveler 202 dropping off his checked luggage at Area A drop off location 254, the system recognizes that it is associated with him. For example, a luggage drop device associates the traveler (individual) with a luggage tag including a barcode or a radio frequency identification tag responsive to, for example, a reader scanning the traveler's driver's license. This relationship (item to a related individual) may be stored in a data structure, such as a database, associated with the cloud service/computing resource, the central resource, third party resource and done so through use of a unique identifier that is maintained in, for example, a record in a relational database. This process can include an individual interacting with a touchpoint, electronic devices at the drop off location capable of obtaining biometric information from the individual. In embodiments, a reader, such as an optical document reader or RFID reader included in the system, obtains this information from a boarding pass when the traveler checks in, from government-issued documents such as a driver's license or passport, or from similar items. In other instances, information from the document is used to identify a source of information. For example, information from a machine-readable zone (MRZ) is used to locate the underlying information in a database included in or made available to the system. These approaches may be expanded to the use of the mobile device itself, e.g., a mobile driver's license.

Once the traveler's identity is determined and matched with corresponding information accessible by the cloud service 222, the system accepts the luggage. The individual 202 via his/her smartphone may be directed to a second area (Area B 258) for personal security scanning and/or and physical screening of items closely associated with the individual (e.g., carry-on items) based on an assigned category which may be in part based on historical information and/or an outcome of a risk determination calculated from physical screening of the checked luggage 229. In some instances, a display device or speaker associated with one or more of the electronic device (e.g., CT device 112), a touchpoint, or smartphone is used to provide a prompt as to a next area to which the item or individual is to progress, e.g., Area B.

The output information 250 generated by the scanning of checked luggage 229 may be used within the scanning area if further inspection of the luggage is appropriate. The output information 250 can also be transmitted to the cloud service 222 for analysis including comparison with the historical information 248 and the first traveler category and/or as data used for determining through computer calculation performance of or a setting of a device for a later screening process. The cloud service 222 can adjust a category used on subsequent scanning processes if additional screening is determined to be appropriate by the cloud service. For example, the scanning of checked luggage 229 may indicate a more intrusive inspections is to be applied, such as if the first screening process yielded a fail or an anomaly as determined by the cloud service based on the inclusion of anomalies or items/areas of concern as determined by automatic threat recognition software implemented in conjunction with the scanner, e.g., an X-ray, CT scanner.

The cloud service 222 can update the category for personal screening using one or more of the historical information 201 and the output information 250, as illustrated in 252. The cloud service 222 in this scenario transmits (electronically) the resulting category to a device use in conjunction with the later or second screening. In the illustrated example, this is a computing system controlling the AIT 218. The cloud service 222 can communicate this information in response to completion of the first screening process or in response to occurrence of an event, such as an individual arriving at an area associated with the subsequent screening (e.g., geolocation of the traveler's phone in the area (area "B")), scanning a token (such as a boarding pass, identification document (whether physical or electronic)) or the like.

Coextensive with completion of a previous screening process, an individual may receive a message, via a GUI output on a display included on his smartphone 206, with directions to an area or device for a next screening process. In some embodiments, a message is an inquiry that in reply to user response provides directions. For example, responsive to receipt of one or more pieces of checked luggage, the cloud service messages Nicholas' phone asking whether he has carryon luggage. The cloud service's directions in embodiments is at least partially based on the received response. For example, the cloud resource returns directions to an area corresponding to a passenger screening queue (Area B) if the reply indicates he has no carryon, while the message includes directions to a CT scanner if the response indicates he does possess a carryon.

As illustrated, an individual is routed to a personal screening device, e.g., MMW scanner 118. Responsive to location detection indicating the individual and/or his/her smartphone's arrival, or for example a check-in procedure, indicating presence in area B, a personal screening device, such as a millimeter wave scanner is used to scan him/her for unauthorized items carried on his/her person. For example, a magnetometer (a suitable personal screening device) is implemented to screen for metallic items. The personal screening device in some instances implements a threshold that corresponds to a category to which the individual belongs. In an example, the individual is routed to the particular device or area as it is already associated with the particular category or threshold to which the individual belongs, e.g., the cloud resource routes a medium category individual to an AIT machine already (preexisting) operating a medium level by electronically communicating directions and/or a map to the traveler's smartphone. In other examples, the system instructs a screening device to implement a particular threshold corresponding to the traveler's category in response to a determination (such as based at least in part on the output of a previous screening). The system (cloud service) can communicate instructions to the device to alter its threshold in response to output from the previous process (e.g., process 1); when the system issues a communication to the individual's smartphone, or in response to the presence of the smartphone in an area associated with the subsequent process or device (geolocation), in this case area B; in response to a check-in procedure corresponding to the area or device, e.g., scanning a barcode, issuing a communication (clicking a button), or the like as understood by one of skill in the art.

One of ordinary skill in the art will recognize that the order in which screening processes are performed (e.g., checked luggage, carryon, individual screening) can be varied or conducted in any order (including co-extensively or substantially co-extensively) based on historical information, information output from previous screening. The type of electronic devices used in each of these scanning processes may be changed to provide the level of inspection needed to obtain a desired level of security considering the information known about the traveler and his or her items. Categories and thresholds may be customized or semi-customized based on one or more of historical, output, device parameters, device configuration, or security level.

The screening procedures and devices used can vary based on operational scenarios as understood by one of skill in the art. For example, a border check may involve grouping individuals based on admission status (citizen, permanent resident, temporary status, visa class); identifying individuals base on asserted biographic information; biometrically identifying at least a port of the individuals (visa holders); initial inspection outcome; secondary inspection (targeted for prohibited items: agricultural products, weapons, financial assets) and so forth. In for example, a department of motor vehicle situation, screening includes requested service (renewal, initial test, commercial test); eye exam; written testing; driver test; biometric identity validation, dispersing a physical token (identification card/driver's license); issuing electronic credentials; and the like as understood by one of skill in the art.

Figure 2B:
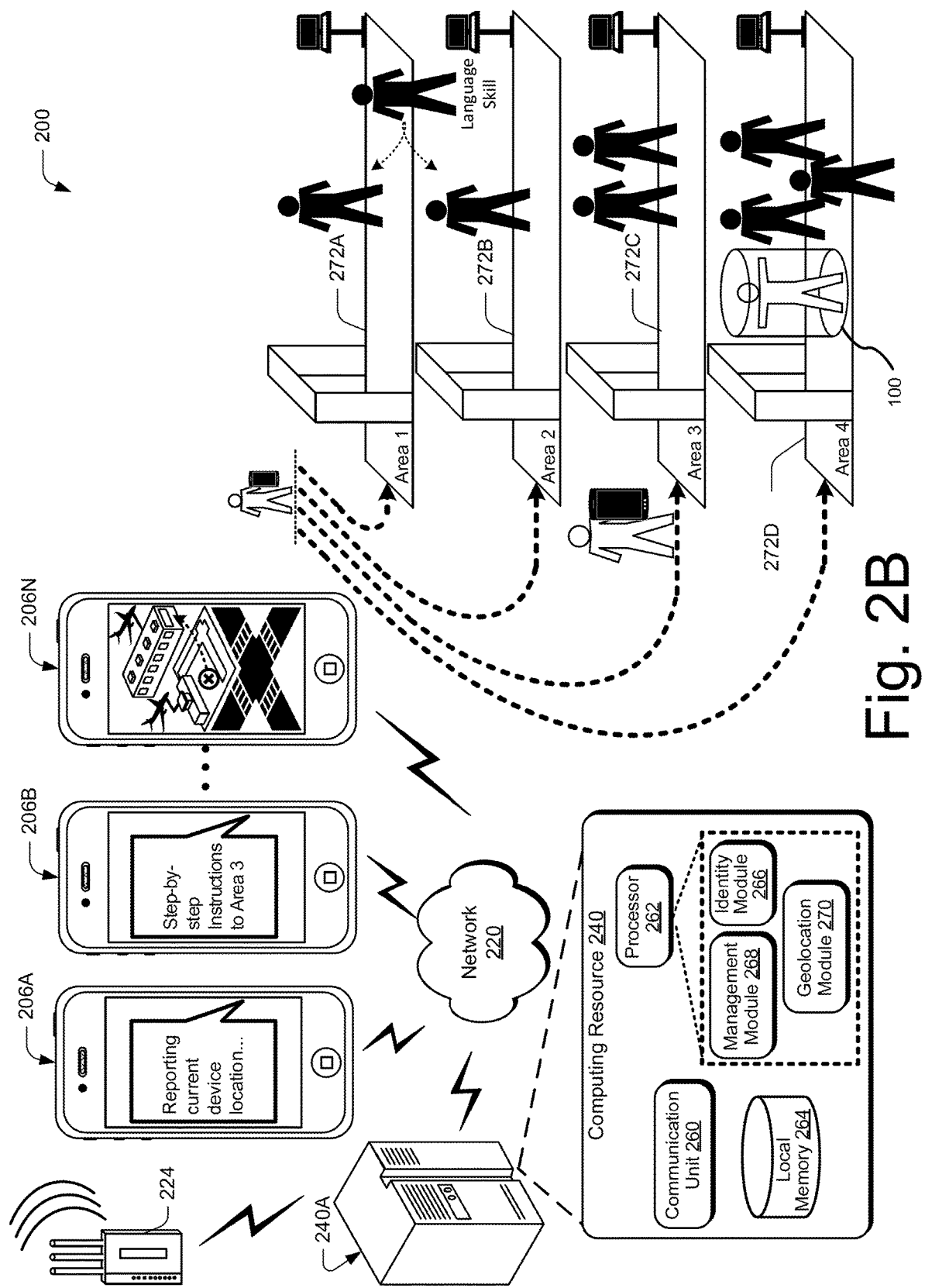
FIG. 2B illustrates a security checkpoint utilizing dynamic thresholding for items based upon geolocation wayfinding of items in accordance with one or more embodiments.

Turning to FIG. 2B, a computing resource 240 in addition to other aspects of this disclosure are illustrated in additional detail. The computing resource 240 is shown as a physical computing system (e.g., a server 240A that supports one or more mobile devices (smartphones 206A-N)), devices included in the system (electronic devices such as AIT machines, CT devices, magnetometers, cameras including cameras enabled with biometric capability, electronic gates, access control devices, beacons 224), or the like as contemplated by one of skill in the art. Although illustrated as a server type computing system, multiple servers or the computing resources within devices may be used to provide the described hardware/software as a cloud type service, such as that illustrated as cloud service 222. This may be done for a predefined location (e.g., an airport terminal, port of entry, security lane, department of motor vehicle station, a physical location). While the computing resource 240 is described in physical proximity to other system components, it should be appreciated that this may be done to ensure the computing/electromechanical devices forming the system include resources that meet predefined functional criteria such as computing capability, memory capacity, communication throughput, response times, and so forth based on pre-established performance criterion.

As illustrated, the computing resource 240 includes one or more communication units 260, processors 262, and memory, illustrated as "local memory" 264. The communication unit 260 is representative of one or more devices able to electronically communicate information to/from other devices and components including in instances those included in or external to the system. Example communication units include but are not limited to wireless modems (such as an 802.11 compliant unit), wired (e.g., Ethernet-ready) or other such communication interfaces, near field communication (NFC) transceivers, and/or a cellular communication transceiver. Example 802.11 compliant modems/cards include but are not limited to those compliant with 802.11n, 802.11ac, 802.1ad, 802.11ah, 802.11aj, 802.11ax, and the like wireless local area network standards promulgated by the Institute of Electrical and Electronics Engineers (IEEE), New York, N.Y. As will be appreciated, the communication units can be used in a variety of combinations and arrangements based on operation parameters and design preference, to communicate with system components and resources (e.g., third party computing resources) external to the system. In embodiments, communications unit 260 includes a combination of hardware and software, while the processor 262 can support the communication unit; in other instances a dedicated processor is included in or with the hardware that forms the communication unit 260.

Although a single processor and memory are illustrated, the computing resource 240 can be constructed with multiple processors and memory based on design preference. The processor 262 is representative of hardware configured to process computer executable instructions, such as a central processing unit that executes a program of instructions. In embodiments, the processor 262 implements an operating system which is a set of computer executable instructions that allows the processor to perform specialized instructions according to a program running on the operating system/processor platform as described consistent with this disclosure.

Local memory 264 is representative of a wide variety and types and combinations of memory suitable for storing information in an electronic format. Example memory includes, but is not limited to, random access memory (RAM), hard disk memory, removable medium memory, flash storage memory, and other types of computer-readable media including non-transitory data storage. For example, local memory 264 stores a variety of information obtained from the central resource, mobile devices, devices used for physical or identity screening, touchpoints, and so forth. Although local memory 264 is illustrated as within the computing resource 240, in some instances, local memory 264 includes an array of memory devices, such as in a RAID configuration.

In embodiments, local memory 264 is constructed to hold information, such as historic/planned trip information, category determination, device threshold information, device output information, information obtained from third parties including "pulled" or "pushed" information, for a predefined period of time, e.g., for 24 hours prior to an anticipated transaction, 24 hours after a transaction. In some instances, under control of the processor (e.g., the management module 268) the local memory holds a summary of information for a transaction or series of transactions. For example, after a predetermined amount of time or on occurrence of an event, the processor generates a summary of a transaction which is retained in memory while physical memory related to comparatively more detained information is deleted or released for reuse (writing over with other information). Local memory 264 may release information from memory after a predetermined time, occurrence of an event (e.g., the central resource confirming it has information for a transaction), or the like. In an example, the processor 262 is configured to control the memory contents (e.g., wipe or overwrite the memory) based on various such predefined or triggering events. Local memory can be configured in a variety of ways based on design preference, performance considerations, and so forth. For example, the computing resource 240 holds information in a registry that is refreshed upon the occurrence of a predetermined event or expiration of a time period.

FIG. 2B illustrates the computing resource 240 including various modules that are representative of hardware/software that are constructed to provide the described capabilities such as through execution of a program of instructions that when implemented by hardware function in the described manner. In embodiments, modules are logical combinations of hardware and software designed to electronically perform the described functions and support objects (instances) such as through operation of instructions that cause the hardware to provide the described function. In embodiments, the individual modules interact through one or more application program interfaces (APIs) that permit interaction and passing of information between the hardware/software forming a particular module with that of other modules and data structures, e.g., databases. In some instances, the modules or subgroups of modules are integrated into a unitary program of instructions based on design preference. The software can be embodied as a program of instructions stored in memory (e.g., non-transitory memory) that is accessible to the processor at runtime, or execution. In instances, hardware supporting the modules includes an operating system, which can be stored in memory, on which the described modules function.

As illustrated, the computing resource 240, supported by the processor 262, includes geolocation module 270, identity module 266, and management module 268. While shown and described as individual modules, the supporting hardware/software can be configured as an integrated program of instructions to provide the described functionality, such as through the use of application program interfaces (APIs) that permit individual programs to interact such as by passing information to one or more other programs and provide one or more graphical user interfaces (GUIs) output on a display to a user to access information or exercise control over the front end system including touchpoints, beacons, biometric capture devices, and other resources, e.g., electromechanical devices used for physical screening, identification of individuals, access control. It is to be appreciated that the described modules can provide this service as part of, for example, a localized cloud service used to support one or more physical screening devices (e.g., communicatively interconnect connected by network 220) or procedures as described throughout this document and as understood by one of ordinary skill in the art.

The illustrated geolocation module 270 represents hardware/software constructed to provide location services. For example, the geolocation module 270 includes software, implemented by hardware, configured to geolocate a smartphone by calculating a device location (or receiving a calculated location from, for example, a beacon) and electronically comparing a reported or determined location to, for example, a lookup table registry of geolocations that are predefined to geographically identify whether the smartphone is within a predefined area, such as an airport, a checkpoint, a port of entry, a queue line, a baggage drop, a room, an area associated with a device such as a physical screening device, a testing station, an area defined by electronic "fencing," (such as defined by coordinates) and the like as understood by one of skill in the art. Although Wi-Fi based geolocation and systems are referenced, those of skill in the art will appreciate that various positioning systems can be used; these include, but are not limited to, global positioning system (GPS), cellular positioning, Galileo global navigation satellite system (GNSS), magnetic based positioning system, inertia based positioning systems, near field communication (NFC) positioning systems, and combinations thereof.

In other examples, the geolocation module 270 performs this location identification based on whether or not the mobile device is in electronic communication with one or more wireless type communication transceivers, such as Wi-Fi router with a predefined "limited" distance communication capability. They include but are not limited to BLUETOOTH or NFC with a one-hundred-foot operable range, or a low power cellular transceiver with an effective range that corresponds to the area to be "fenced." In this way, the computer resource associated with the wireless communication devices does not calculate an actual location (e.g., a precise or semi-precise location based on operating parameters), such as through triangulation, of the mobile device, but it is "presumed" due to the device's effective range, e.g., received signal strength indication (RSSI) and the mobile device being in communicative contact with one or more transceivers. For example, the computing resource 240 determines that a mobile device is within ten meters or thirty-two feet of a BLUETOOTH transceiver as this is the pre-established effective range of the transceiver and it is in communication with the mobile device. In embodiments, the geolocation functionality described in relation to the computing resource is provided in a distributed fashion (e.g., round robin, localized hand-off, first in first out) with, for example, a computing resource for a checkpoint lane (under control of the cloud resource/computing resource) making the location determination using a geolocation module as described to make a decision based on wireless sensor/beacons/etc. for that lane, area, or physical screening device such as a MMW scanner.

In some instances, a reported location is a location reported by a mobile device, such as a smartphone, a smartwatch, or the like, e.g., "self-reported." In this instance, the mobile device calculates its position and reports it to, for instance, the cloud service 222. In other instances, the system obtains location information from a device other than the device being located. For example, one or more Wi-Fi beacons report a location associated with a smartphone in communication with one or more of the beacons, e.g., three beacons to triangulate the device's position. This communication may be for establishing the smartphone's location or may be an ancillary to, for example, communicating information with the system. In another embodiment consistent with this disclosure, computing resources associated with the beacon or a location subsystem of the system determines that a mobile device is within an area (e.g., a predetermined area) and electronically communicates the status of the mobile device to the computing resource 240, e.g., present or not present.

The foregoing Wi-Fi (WPS) triangulation can be done in place of or in addition to permitting the smart (mobile) device to self-report its position with, in some instances, the geolocation module 270 electronically determining the mobile device's position. For example, the geolocation module 270 is configured to permit the smartphone to initially self-report its location (e.g., arrival in a general location), while system components and the geolocation module 270 make a location determination whether or not the smartphone in predetermined other instances, e.g., an electronic determination as to what threshold the computing resource 240 instructs a magnetometer to use. The foregoing can be done when, for instance, increased accuracy or security is a factor. An example of the latter is when an individual or an item is directed to a particular location for physical screening or identification. In an instance such as this, the system uses Wi-Fi beacons or routers as the basis of location information to promote security (e.g., avoid location spoofing), increase accuracy (e.g., in comparison to GPS geolocation), assist an individual (wayfinding), due to technological limitations (e.g., a cellular dead zone), or the like. For example, the system includes a radio frequency identification (RFID) reader constructed to determine the presence or absence of a tag (and therefore an object to which the tag is connected) in an effective area for the reader. Those of skill in the art will appreciate that computing resources associated with the Wi-Fi beacon or router can preprocess or handle some of the processing tasks described in conjunction with the geolocation module 270 in some embodiments in accordance with this disclosure.

Moreover, the geolocation module 270 can provide location information on a periodic basis (e.g., every minute), in response to a request (e.g., a request by the management module 268 for location information), or upon occurrence of an event, e.g., a person/smartphone leaving a test center check-in area, a mobile device moving more than ten feet from a currently calculated position, the mobile device or a beacon reporting a velocity change greater than a pre-established threshold. An example is a beacon updating a table or registry in response to a mobile device moving more than five feet from a previously calculated position within a minute.

With continued reference to FIG. 2B, the illustrated identity module 266 represents hardware/software configured to provide identity services for a variety of purposes in accordance with the present disclosure. For example, the identity module 266 provides identity information that the management module 268 interrelates with geolocation information, so the location, direction of movement, and so forth for a mobile device are connected to its identity (device or individual), such as in a relational type database. In the foregoing and other implementations, the identity module 266 acts as a service or under control of the management module 268. The identity module 266 can forward information using a variety of approaches, such as but not limited to, communicating identity information to the management module 268 on a periodic basis, responsive to a request from the management module 268 or geolocation module 270, on occurrence of a predetermined event (e.g., upon the geolocation module 270 indicating the mobile device moved a predetermined distance).

For example, the management module 268 intermittently or upon occurrence of an event combines identity information supplied by the identity module 266 with its category determination and forwards the information to a resource associated with a checkpoint (e.g., an identity management computing system, or screening device with identity capability). The management module 268 can do this so the identity management system can compare identity information supplied by the mobile device as part of an electronic handshake procedure with that from the management module 268 to confirm that the device (and individual associated with the device) are to use particular resources/be screened to a corresponding invasiveness level. In this scenario, the identity module 266 supplies the identity information (e.g., SIM card number) in response to a request from the management module 268. In other scenarios, the identity module 266 periodically "pushes" identity information. The identity module 266 can push information at a predetermined time or it can do so responsive to an event other than a management module 268 request. For example, in response to an individual clearing customs (e.g., exiting a port of entry inspection area), the geolocation module 270 can update a table configured to hold last known position and identity information for the mobile devices interacting with the system. In this instance, the geolocation module 270 and identity module 266 update a temporary registry with location and/or identity information.

Other scenarios are also contemplated within the understanding of one of skill in the art. For example, individual screening devices may include integrated identity management functionality to control which individuals are permitted to use a particular screening device, e.g., a MMW scanner. In other instances, the system includes resources such as electronic gates include hardware/software to control access or direct individuals and items through various screening processes, e.g., to a device used in a screening process.

In embodiments, the computing resource holds this information in, for example, a lookup table in random access memory (RAM) for a predetermined period of time or until occurrence of an event, e.g., the memory is released for reuse and is reused to hold other data. The services of the identity module 266 can be based on the identity of a device (e.g., SIM card number, telephone number, unique identifier, email address), an individual that is interconnected or associated with a device, and combinations thereof. The latter case encompasses users, individuals that possess the particular device, an owner, someone that is associated with the device (e.g., a child being affiliated with a parent's device) due to a legal relationship (e.g., having a legal relationship with the phone owner, possessor, or user) or a technical relationship (e.g., having a "user profile" on the device), and so forth as understood by one of skill in the art. The system, for instance, directs a particular mobile device and by extension associated individuals to a particular location or device based on identity, whether device or individual identity. In the preceding scenario, the system can implement access control devices (e.g., man-traps, electronic gates) to direct, control, or prevent individuals from taking actions or permit them to take predefined actions, e.g., egress an area in response to opening of an electronic gate. In other instances, the management module 268 issues instructions that cause the mobile device to output guidance, such as an audible warning, a map, "turn-by-turn" instructions and so forth.

For instance, the identity module 266 enters a unique identifier (e.g., a telephone number, SIM card number, driver's license number, passport number, name, date of birth (DOB), or a combination thereof) in a registry as mobile devices present themselves to the system. It is to be apparent that the identity module 266 can assign its own unique identifier to the respective entries or records, it can implement a common type of identifier (e.g., telephone number, combination name+DOB), or implement an ad hoc approach, e.g., use SIM card in some instances while using name+DOB for other instances. In some scenarios, the identity module 266 is programmed to do this in response to the mobile device joining or entering into communicative contact with the system. In other embodiments, the identity module 266 compares provided identity information with corresponding historic information to confirm electronically that asserted identity information matches that held by or made available to the identity module 266 such as by a third party resource; the outcome of this comparison may be used for other purposes, such as setting or being used as information for setting an invasiveness threshold, e.g., use of a mobile device previously associated with a "known" identity as a factor in determining a trust or intrusiveness level.

In embodiments, the management module 268, or the identity module 266 is configured to expire, remove or overwrite information in the registry, lookup table or data structure at a predetermined time (e.g., anticipated departure of a flight, after twenty-four hours) or responsive to an event, e.g., actual departure of a flight, after completion of final screening, responsive to a device failing to respond to a communication check/heartbeat communication. In some embodiments, the system retains or stores at least a portion of information in (comparatively) longer term storage such as for historical purposes; in other instances the system (e.g., the computing resource or cloud service) is configured to retain summary information or derived information (e.g., a score, anomaly yes/no); in other instances the storage of information is conditioned on user affirmatively indicating he/she wants the system to retain at least a portion of the information. Although variables may be calculated as a score, such as a scalar or vector value, in embodiments a computing resource converts the score into a binary value (e.g., yes/no). Those of skill in the art will appreciate that a data structure associated with a central resource may store historic information such as in memory for or otherwise related to the central resource. In embodiments, in response to user designation, a third-party resource retains at least a portion of the information. For example, a user electronically directs that an airline loyalty system (e.g., a trusted third party) receive at least a portion of the information or information derived from the information for future use as historical information. In situation such as this, the system may retain some information, such as rudimentary transaction information that is less than that retained by the system in other instances, such as a user selecting "opt-in" to participation in the system retaining additional data.

As also illustrated in FIG. 2B, the computing resource 240 includes a management module 268 that represents hardware/software usable by the computing resource to manage interactions of the system with mobile devices and individuals and items associated with mobile device. Example system devices that can interact with items and individual include, but are not limited to, physical screening, identification devices, and items/individuals such as part of an overall process, e.g., a physical screening or identification process. As the reader will appreciate, the functions or services of the management module 268 can be provided as part of a cloud service, such as an integrated cloud service that functions to provide the services supported by the identity module 266, geolocation module 270, and management module 268. While illustrated in FIG. 2B as part of a computing resource, those of skill in the art will appreciate that the management module 268 function and the services can be supported in a distributed manner with some of the tasks assigned to computing resources affiliated with subsystems or devices integrated into the system. Naturally, the resources providing the function/service can include appropriate software to effectuate this capability. Having provided various scenarios and environments, operation and construction of the management module 268 will be discussed in further detail as will be more fully appreciated in light of the above disclosure and the remaining portion of this application as understood by one of ordinary skill in the art.

With continued reference to FIG. 2B, the management module 268 is constructed to manage routing of items and individuals as they interact with electronic devices, such as electromechanical devices implemented for screening or identification purposes in accordance with embodiments of this disclosure. In embodiments, the management module 268 manages the geolocation module 270 and identity module 266 functionality to tailor routing of items, individuals and the settings of devices included in the system. The management module 268 can do this by implementing an algorithm to, among other functions, route or direct items or individuals to areas associated with different processes, e.g., physical screening processes, electromechanical devices based on historical or obtained information that associates the item or individual with a particular level of screening such as that associated with a category, e.g., low, medium, high (relative to one another).

The management module 268 can implement a variety of factors that correspond to or are derived from historical or collected information as part of its analysis. Example algorithms implement a variety of approaches for assigning an item or individual a category or a level of physical screening. Example algorithms can make use of Monte Carlo simulation, probabilistic forecasting, predictive modelling, Bayesian probability modeling, event tree analysis, fault tree analysis, artificial intelligence approaches, or Markov modeling. While the foregoing can be done on a per item/individual basis, the management module 268 can implement system wide or resource factors as part of determination on how to direct the particular item or individual. For example, the management module 268 is programed to load balance physical screening devices in order to meet a predetermined time threshold or to achieve an average throughput or throughput time based on a variety of factors associated with the items and individuals to be screened and the available resources. In some embodiments, the algorithm applies historic and/or information from physical screening processes as an indicium of potential risk. The foregoing can consider information in relation to capacity and safety along with magnitude and probability.

In embodiments, the management module 268 calls on or can control the identity module 266 and/or geolocation module 270 for information/services as part of its assigned tasks. For example, the management module 268 queries the geolocation module 270 to identify the location of a mobile device associated with a comparatively low risk individual, so the management module 268 can direct him/her via the mobile device to a corresponding "low" invasive screening device that is physical near the location of the mobile device. In some embodiments, the management module 268, geolocation module 270, and identity module 266 are arranged in a client/server relationship with the management module 268 delegating computing tasks, while retaining overall control of one or more of the identity module 266 or geolocation module 270. Although physical proximity is discussed, other factors can be consider; these include, but are not limited to, device utilization, anticipated or projected utilization, physical proximity of other item or individuals whether actual or anticipated (e.g., an individual is routed to an area to avoid an influx of other similarly situated individuals such as the anticipated arrival of a plane carrying a large number of passengers) and so forth.

In another example, while a management module 268 in a cloud service for an airport initially assigns a device, individual, or group of individuals to a particular checkpoint that is made up of multiple lanes potentially implementing different procedures and security levels, the management module 268 may hand off or delegate management responsibility to a virtualized cloud service for the checkpoint supported by computing resources available to the checkpoint. Thus, in the preceding example, the computing resource for the checkpoint may route or reroute mobile devices and individuals under its control based on a variety of factors including overall factors relative to the checkpoint. It is to be appreciated that the management module 268 for the cloud service can take over or override control from that of the checkpoint, or the virtualized cloud service for the checkpoint can return control based on existence of a predetermined condition or event for the local environment (e.g., the checkpoint) or for that of the system, e.g., a test facility.

For example, the computing resource using the identity module 266 and geolocation module 270 direct an individual 202 via his/her mobile device to a variety of locations (e.g., areas "1-4") based on the identity of the mobile device (and/or an individual associated with the mobile device). In the preceding example, upon arriving at a facility, a user can either directly (such as by clicking a "button") or indirectly (such as by preconfiguring his/her mobile device to participate with the system 200) identify the device and/or himself/herself to the system. For instance, upon arriving at a testing center, a user clicks "participate," which results in the device sending the system 200 information (e.g., device information such as SIM card number, telephone number, email address, or a unique identifier (e.g., a session or a transaction identifier)). Additionally, or in place of the foregoing, the mobile device (e.g., smartphone) sends the system information about individuals affiliated with the device, e.g., owner, user, individuals in the person's traveling party and so on.

In other instances, the computing resource has (such as stored in memory) or can access information (e.g., from a third-party resource) related to or associated with information provided by the mobile device. This includes, but is not limited to, user entered information or information derived from information existing on or obtainable by the device, e.g., stored testing or travel plan information, profile information, output of a physical screening or identification device or combinations thereof. In some instances, the device itself and/or the system 200 determines the position of device (and as a result, the people associated with the device). With this information, the system 200 can direct the mobile device/individuals based in part on the provided information. This capability is discussed in further detail in conjunction with the management module 268 among other portions of this document.

For example, the system 200, in response to a smartphone presenting itself as being within the predetermined area or the system determining the device is present and the identity of the device, communicates instructions that cause the phone to output, such as on a display included in the smartphone, or offer for output (e.g., "click here for directions to screening area '1'"). In the foregoing situation, the computing resource 240 may in part do this based on the location of the mobile device (e.g., smartphone), individuals related to the device and the identity of the device itself or of related individuals. In the preceding example, the computing resource (e.g., management module 268) accounts for other information including, but not limited to, system performance, resource availability, capabilities (technical or personnel), information for other item or individuals. In an example, the computing resource 240 wirelessly communicates instructions to the mobile device via a wireless router/beacon such as illustrated as 224 that cause it to output a map on a display included in the mobile device with directions to area "1." Area "1" is associated with a bilingual English/French officer because historic information, such as included in a user profile retrieved by the system in part in response to the identity and location of the device, indicates an individual speaks French. The computing resource's routing determination (as implemented in part by a wayfinding or mapping algorithm) may take into account an actual or anticipated delay associated with, for example, a screening lane associated with area "1." This is but one example of a computing routine electronically implemented by the computing resource to route individuals.

Those of skill in the art will appreciate that the computing resource 240 including the described modules may be programmed to account for a myriad of factors including competing factors or be capable of synthetically learning (such as through use of machine learning techniques including but not limited to Artificial Intelligence) and applying learned lessons to resolve complex computing scenarios consistent with the principles of this disclosure. For example, software comprising a program of instructions causes the computing resource 240 to implement an algorithm to analyze competing factors (while maintaining a physical screening to a calculated level of intrusiveness) to determine to which location or device the mobile device or person should be routed. While the system can do the foregoing, for example, to minimize wait time or, based on information associated with the individual, in some examples, the computing resource considers information associated with or otherwise related to overall operation, e.g., average wait time, resource availability, distance, economic impact, and so forth at contemplated by one of skill in the art.

Having described example environment, systems, devices and modules constructed of (in some instances) hardware/ software, example methods will be described in further detail. Those of skill in the art will appreciate that the described methods, steps, approaches and techniques can be implemented by (but are not necessarily restricted to) the above systems, devices and modules. In some embodiments, the methods, steps, approaches and techniques can make use of the described hardware and/or software as contemplated by one of ordinary skill in the art. The sample methods are described in relation to particular tasks and corresponding environments. Examples include, but are not limited to, airline screening, driver's license testing, educational testing, entertainment (sports, concert) safety screening or identification, border crossing.

Example Methods

The following discussion describes procedures that may be implemented using the previously described systems, techniques, approaches, and devices, although the described procedures are not restricted to that previously described. Aspects of the procedures may be implemented in hardware, firmware, or software, or a combination thereof. The procedures are shown as a set of blocks that specify operations performed by one or more electronic devices and are not necessarily limited to the orders shown for performing the operations by the respective blocks. In portions of the following discussion, reference will be made to the environments, systems, devices, modules, applications, algorithms, approaches, and techniques described above. While some blocks/decisions may be captioned as "optional", there is to be no negative inference with respect to blocks/ decisions that are not denominated as "optional," i.e., blocks/decisions are not "mandatory." In accordance with some embodiments, information is stored in memory (at least temporarily) during performance of the methods for a variety of reasons. Example rationales include, but are not limited to, data processing convenience, communication convenience, permit batch validation/review, records maintenance, and so on, and combinations thereof.

Figure 3:
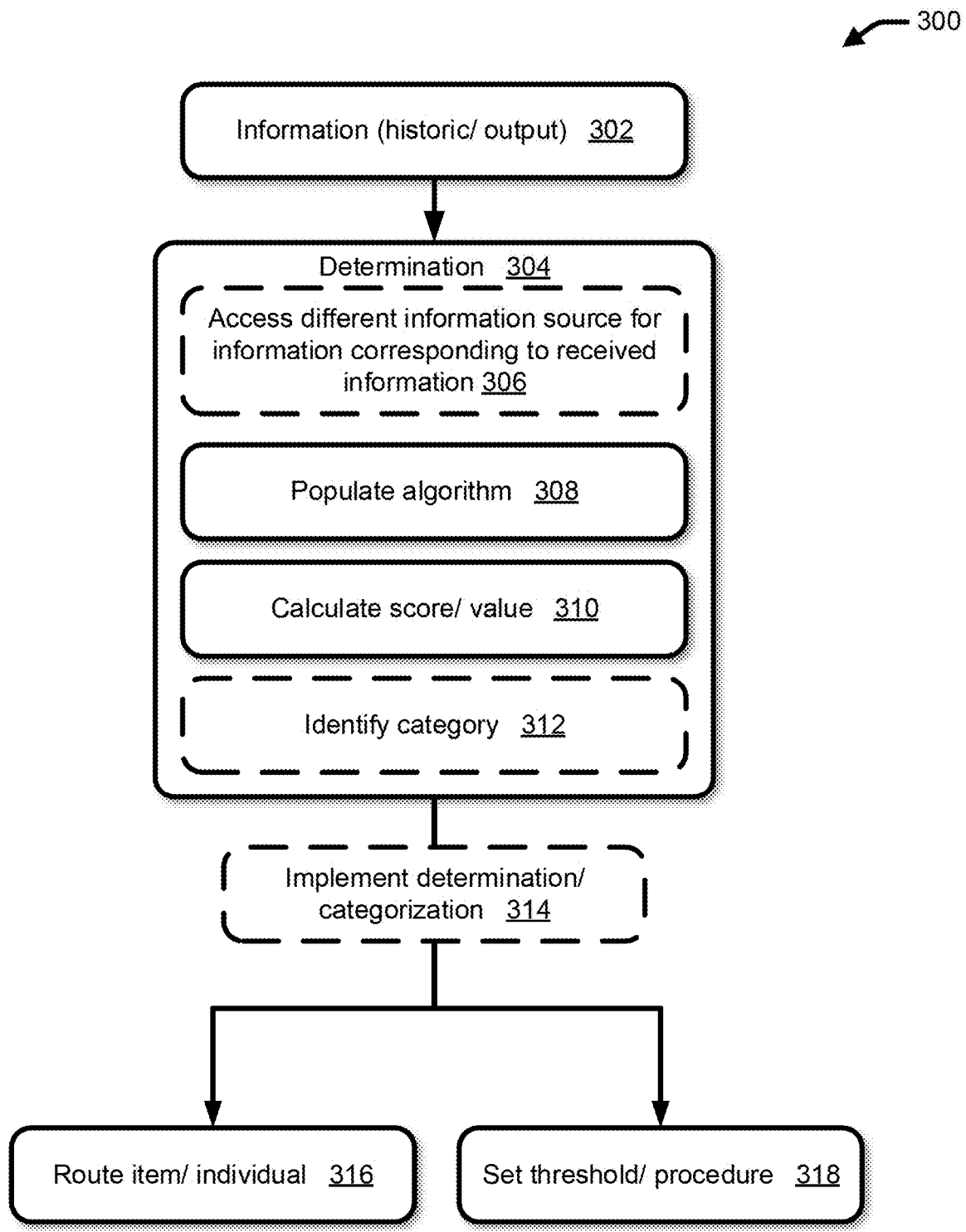
FIG. 3 is a flow diagram that describes steps for dynamic thresholding that can be used in conjunction with geolocation wayfinding disclosed in this document in accordance with one or more embodiments.

FIG. 3 is a flow diagram of a method 300 that illustrates application categories to, for example, physical screening processes such as those implemented for physical security screening. The method 300 includes a determination that can be used to designate to what extent a physical screening device is configured/operates. This may be done for controlling operation of an electromechanical portion of the device (e.g., a sensor, a detector), its software (e.g., software used to analyze data output in digital form from the detector), or combinations thereof.

In examples, the output of determination serves as a basis for routing an item or individual to an area. For example, a computing resource uses a value or score output from the determination in a device management algorithm configured to manage one or more devices used to perform task like physical screening. The computing resource, under control of device management software, implements the determination to electronically direct the item or individual to an area associated with a device that is or will be configured to operate at a level consistent with the determination output. For example, a system implementing the method provides instructions to baggage handling machines that move an item to an area associated with device (e.g., a queue) that implements or will implement a sensitivity setting corresponding to that designated by the determination, e.g., a category. In the latter instance, the device is triggered to operate at the corresponding level in a variety of ways, including but not limited to RFID notification, electronically reading a token, or geolocation, e.g., use of a GPS or Wi-Fi enabled smartphone.

For instance, a CT conforms its operating parameters (physical or software) to that which corresponds to the determination output in response to a user optically scanning a token containing machine readable information. The CT can switch from a first operating configuration to a second configuration under computer control. The computing resource controlling the CT can store the determination score in, for instance, a temporary register or lookup table in association with an identifier of the item or individual and other related information, so it is available for use in response to a triggering event.

Although individual or tailored categories are within the scope of this disclosure, in some instances a range of scores that result from the determination are assigned to a category or threshold and a device operating in conformance with the method operates at a level consistent with that category. For instance, items with a score of between 1-500 (one to five hundred) are assigned a "low" category and are subject to screening at a less intrusive level than items with a score of between 501-1,000 (five hundred one to one thousand), which are assigned a comparatively higher category in at least one respect relative to that of the "low." For example, the method 300 implements the determination score as a basis for routing the item to an area affiliated with a device that corresponds to that score or a category to which that score belongs. This score could be the sensitivity level of a CT machine used to detect an object of interest, e.g., a weapon. A threshold can correspond to a degree of sensitivity in comparison to a device's operating range. In other implementations, the score relates to a pre-established or predetermined operating parameter at which the system/ device operates for an average or medium scenario or situation.

Those of skill in the art will appreciate that a threshold can be for an algorithm implemented in software used to analyze a detector's output. Thus, the device's physical configuration is fixed, but the threshold implemented by a computer algorithm is changed to be more sensitive or less sensitive depending on the outcome of the determination. For instance, a biometric iris scanner implements a common scanning protocol, but its biometric matching/identification software requires a higher match percentage (e.g., 99.7%) than that which the software typically (99.0%) implements for the majority of the individuals to be screened as a result of the determination.

A system or device implementing the method 300 in accordance with this disclosure can implement a variety of informational 302 factors as part of its electronic determination. This information may be historic, such information obtained or derived from previous interactions or the output of devices that are coextensive in time or are part of a single transaction that is logically connected, e.g., physical screening for a sporting event. An example of the foregoing is use of the output from one physical screening device as a factor in a subsequent threshold determination for another device. If an anomaly is detected for check-in luggage screening, subsequent screening of a carry-on item for the individual can proceed in an example, but it would result in application elevated or more intrusive physical screening and/or a comparatively more stringent detection threshold relative to a threshold implemented had the anomaly not been present.

In embodiments, the method 300 includes a determination 304. For example, responsive to receipt of information related to an item to be physically screened, a computer-implemented algorithm makes an electronic determination 304 as to which of a plurality of categories an item corresponds. In embodiments, the determination 304 serves as an information source for various workflows. The determination 304 can serve as a basis for routing the item/individual or establishing a device threshold. The determination 304 in embodiments is expressed as a score that is usable by a computing resource for one or more of categorization, routing, or setting a threshold.

For example, responsive to a user making an airport screening system aware of his/her presence via the user's smartphone, the system electronically determines to what category the individual and/or related items are related, e.g., pre-established categories such as low, medium, high (relative to one another). An outcome of the determination 304 can be communicated to the user's smartphone or another device in response to an intervening event, e.g., a smartphone communication originating from a predetermined area, a Wi-Fi beacon indicating a person is in a predetermined location, computing resources becoming available to make the determination, an individual via a mobile device communicating information, e.g., mobile driver's license information. For instance, the system directs an individual to lane "A" as it corresponds to a category to which the individual is assigned and offers a shorter wait time than other available lanes.

In embodiments, the determination 304 includes obtaining information from one or more resources that corresponds to the received information 306. For example, a computing resource uses identifying information (e.g., telephone number, SIM card number, unique identifier) from a handshake to query a data structure for information that corresponds to the device or an individual associated with the device. For instance, in response to Nicholas clicking "I am here" upon arriving at Reagan National Airport, the system uses a unique identifier from the smartphone to locate historical information for a Nicholas and those in his traveling party, e.g., associated historic information. The system can do this by accessing a local data structure to locate relevant information. This may result from Nicholas' phone supplying a reservation code indicating that he, his wife, and two children have arrived at the airport for a scheduled trip. In this instance, the data structure (local) may have historic information about Nicholas and his family, e.g., a risk score, outcome of previous physical screenings, SIM card id from a previous interaction with the system or a related system, e.g., a central resource that supports multiple generally equivalent systems. While the central resource can push historic data to the local data structure, in embodiments the method requests the information from the central resource or a third-party system. The smartphone/computing resource can automatically provide the information due to an individual having set his/her smartphone to automatically interact with the system.

In an example, a computing resource performing the method obtains the information by requesting it from a third-party source. The system electronically requests a unique identifier (airline frequent flyer or known traveler number) from an airline reservation system, so it can uniquely identify a user. In other situations, an airline system pushes information (e.g., known traveler number) as a result of an interaction with, for instance, the user's smartphone communicating with the airline system of the phone's location at a departure airport. The foregoing can be done when an individual purchases a ticket after a predetermined point in time, e.g., 24 hours ahead of an event. Additional embodiments will be apparent to those of skill in the art based on implementation and design preference.

In embodiments, if a subsequent screening process is logically connected to previous screening (e.g., part of a unified transaction), information from the previous screening or identification process is used as information or a factor for determining what category the item or individual is assigned for the subsequent process. For example, based on a CT scanner reporting no "anomalies" for a piece of luggage, a computing resource populates this information into an algorithm that implements the data (e.g., a risk score) to set a threshold/calculate a category to which the individual associated with the luggage is to be screened by a magnetometer. Eliminating other factors in the preceding example, the system sets the person's category to a low level in comparison to a situation that includes an anomaly.

Block 308 is representative of electronically populating a computer-implemented algorithm, such as a multivariable physical screening risk assessment algorithm, with information usable to calculate a category for one or more of an item or individual. For example, a computer operating in conformance with the method 300 populates a multivariable category determination algorithm with numerical scores associated with multivariables (e.g., travel-related data) that the computer uses to calculate a score that defines what category is to be assigned to the item or individual. In embodiments, an algorithm implements a multivariable risk assessment methodology (RAM) or a Failure Modes, Effect, and Criticality Analysis (FMECA) approach. While in embodiments the algorithm implements the factors on a weighted basis, in other embodiments one or more factors are determinative of a particular category or threshold, e.g., are effectively category/threshold determinative (yes/no). Example factors include, but are not limited to, identification issue date, biometric match score, previous screening security score, age, frequency of travel, and the like as understood by one of skill in the art.

In some embodiments, the algorithm is constructed to accept a super-set of possible factors with a computer implementing the method being configured with instructions to populate one or more factors from the super-set, so it can perform the calculation that functions as the underpinning of the determination 304. An example of the foregoing is a computer selecting a subset of factors that it uses to calculate a category or threshold as part of the determination. In embodiments, a computing resource is constructed to pre-process information (e.g., a numerical score, a binary variable), so it is available in memory to populate the information in the algorithm following a script of computer executable instructions.

Block 310 is representative of calculating a score for the item or individual. In an example, a computing resource uses the populated algorithm to calculate a value or score that corresponds to a category or a threshold for a device. In this way, a computing resource implements the algorithm to process one or more physical security related variables to obtain a numerical score that indicates Nicholas should be accorded a "low" risk category. The computing resource communicates the outcome of the calculation 310 to device, so the device can set its threshold based on the score or value. In other embodiments, the computing resource electronically converts the score to a threshold level that it communicates to the device. In examples, the computing resource is configured to perform such calculations with a subset of variables, presuming that a preconfigured minimum set of data is available for use. A computer resource implementing the method may have predetermined data that is specified for inclusion (e.g., name, date of birth) while other factors are not directly specified, e.g., driver's license number, issue date, previously assigned risk assessment score.

Optionally, the determination 304 includes identification of a category to which an item or individual belongs (Block 312). For example, rather than assigning an item a unique score or a semi-unique score, the score is categorized into a pre-established category, such as high, medium, low (relative to the other categories). Although high, medium, and low are referenced, those of skill in the art will appreciate that the number of groups into which scores are categorized can be greater (e.g., 5 groups) or less (e.g., two groups). In embodiments, the number of groups into which the scores are categorized is dynamically changed before categorization, or the number of groups may be predetermined prior to categorization of an item or individual into a particular group. An example of this is a checkpoint that dynamically changes from a "high/low" into a "high, medium, low" categorization. The change in this example can occur due to system demand among other rationales. The categorization can be expressed as a numerical or other value that is usable to discern between the categories that in some instances correspond to respectively different areas or thresholds when implemented for these tasks by a computing resource or computer-enabled device.

Implementation of the determination (e.g., score, value) and/or the category if one is identified is illustrated as block 314. In an example, a computing resource for a physical screening system implements a category identified as part of routing (Block 316) a corresponding item or individual to an area associated with that category or that will be associated with the category. An example of the latter is a luggage screening device that switches from a first category to a second category that is affiliated with an item to be screened. A variety of mapping/routing algorithms can be used for this purpose and may be implemented in conjunction with computer-implemented software designed to manage resources, for example, to load balance items/individuals to be screened with available resources. An item associated with the second category may be directed to the area because the luggage screening device is or will become underutilized relative to other functionally similar devices under control of a computing resource implementing the method 300. In this example, a software-enabled resource management algorithm electronically determines a device is underutilized based on item throughput or other equipment management factors as reported by devices under its control or from standalone sensors used to collect information relevant to usage of the equipment. Thus, an individual holding a carry-on bag with a "high" designation is electronically directed to X-ray scanner currently operating at a "medium" designation in anticipation that the luggage scanner will switch to "high" after screening any remaining "medium" carry-on bags. Those of skill in the art will appreciate that the luggage scanner can switch from "high" to "medium" responsive to a trigger. Example triggers include but are not limited to an RFID reader on the luggage scanner reading an RFID tag on the carry-on or an affiliated process, e.g., an optical scanner scanning a boarding pass for the individual possessing the carry-on.

In other embodiments, the determination/categorization is used to set a threshold or a procedure (Block 318). For example, an individual routed to a security lane is permitted to keep his/her shoes on and is not required to remove electronics from a carry-on bag because the determination score indicates a less invasive screening is appropriate because the individual is associated with a low score that indicates the person is unlikely to have prohibited items.

Information Resources

Figure 4:
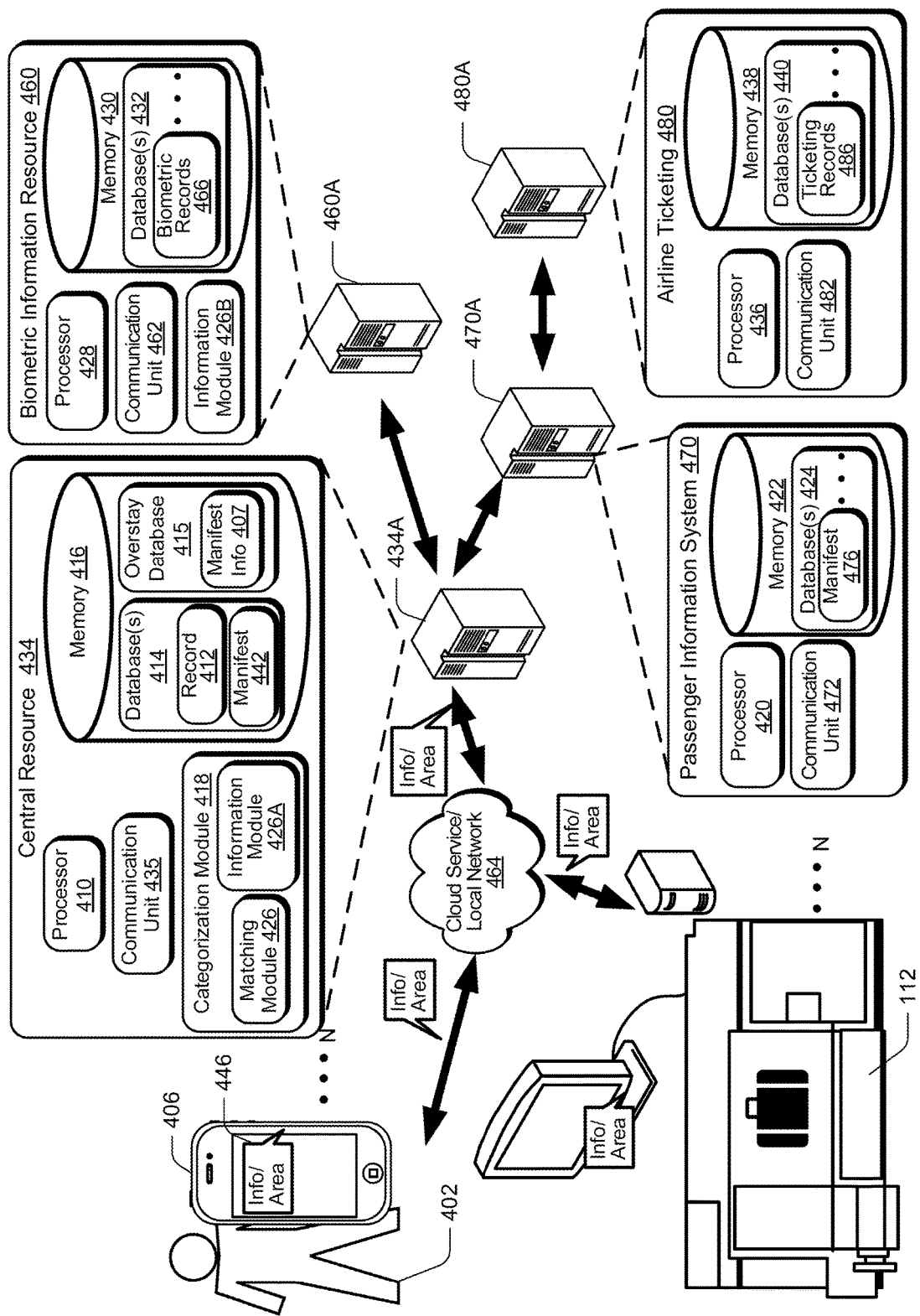
FIG. 4 illustrates an example configuration of resources including third-party resources that can be implemented in conjunction with the devices, systems, methods, approaches, and techniques disclosed in this document.

FIG. 4 illustrates resource configurations including third-party resources implemented in conjunction with the devices, systems, methods, approaches, and techniques consistent with this disclosure. The central resource 434 is illustrative of functionality and corresponding hardware/software to support a cloud service/local network 464 that supports management and operation of one or more mobile devices (illustrated as smartphone 406), physical screening devices (a CT machine is illustrated), access control devices, baggage sorters, and the like for identification, routing and physical screening of individuals and items. The central resource 434 (illustrated as server 434A) is shown as sourcing/receiving information from a biometric information resource 460 (illustrated as a server 460A), a passenger information system 470 (illustrated as a server 470A), and an airline ticketing resource 480 (illustrated as a server 480A). Various computing resources can provide the described information/functionality requested by the central resource 434 and may be embodied as a combination of hardware and/or software that are co-located with the central resource 434 or more likely remotely located. The resources are shown with arrows indicating sample data flows that are physically supported by a variety of communication mediums such as a dedicated network, a semi-dedicated network, the Internet, and so forth. It is to be apparent that the function of the various resources may be provided via a cloud type hardware-software arrangement. As illustrated, the communication is shown as two-way so data can be pushed/retrieved (pulled) to/from the various physical devices based on configuration and design choice as understood by one of ordinary skill in the art, although in various embodiments, one-way communication is compatible. In embodiments, the central resource 434 functions as a gatekeeper by maintaining comparatively high or different security on the central resource 434, in relation to potentially different security schema applied by the passenger information system 470 and/or airline ticketing resource 480. The central resource 434 in embodiments can store, obtain/validate information, coordinate information, match records, link information, and combinations thereof on behalf of the mobile devices, cloud service/local network 464, and so on.

For example, the central resource 434 requests a reference image or signature, and any other information (biographic/biometric), from another resource such as a state department of motor vehicles (DMV) database system. Such DMV databases may be operated by or implement a variety of commercial software or hardware and may be virtualized as a cloud type resource. Those of skill in the art will appreciate that such information may be protected using a variety of security methodologies including, but not limited to, public/private key encryption (public key encryption (PKI)), virtual private network communication or the like to protect information.

In embodiments, the central resource 434 includes one or more computing systems constructed to provide central resource functionality. In implementations where multiple computing resources are implemented, individual ones may operate in a redundant fashion, perform load balancing, handling of processor/memory interrupts, and so forth to provide substantially seamless support to the one or more predetermined local environments (e.g., the front-end system and touchpoints). Redundant support and/or load balancing between multiple computing resources can be handled in a variety of ways. In some instances, systems can apportion different tasks or portions of tasks among themselves, while in other instances central resources accept/hand-off tasks as individual computing systems become relatively busy/become less busy. For example, rather than hashing a raw image or matching a hash of an image to hashes of images included in a gallery, the central resource instructs the mobile device to perform this task on its behalf or on behalf of other resources. In additional embodiments, functions performed by the central resource 434 are performed or partially performed by a computing resource located in a local environment, such as at an airport, port, customs facility, port-of-entry, test facility, department of motor vehicles office, and so forth. In scenarios, the central resource 434 and the illustrated resources apportion responsibilities and tasks according to a predetermined load-sharing algorithm.

For example, while in typical operation the central resource 434 functions as a master by controlling (to at least some extent) information exchange with the mobile device, in some instances the mobile device influences information exchange with the central resource 434 or some function or aspect of the central resource, e.g., area availability. An example of the foregoing is the baggage sorter controlling or directing the central resource to avoid sending baggage to a given area, due to a malfunction.

For example, responsive to a determination that an identification token is suspect, the central resource 434 queries a state DMV database to determine a date associated with its electronic record and/or the token itself, e.g., driver's license. An electronic record and/or token with an older date may be accorded a category corresponding to a lower threshold for the physical screening process (compared to a more recent issue date, where a higher threshold might be desired for the physical screening process). In an embodiment, responsive to a determination, by for example the central resource 434, that a proffered driver's license is "new" due to an original license being lost, stolen, or destroyed, the central resource 434 may apply a categorization corresponding to a higher threshold in comparison to that which it usually implements or apply a different algorithm, and/or obtain additional or comparatively more detailed information than that obtained if the token was not identified as "new."

It should be apparent that multiple baggage sorters can collaboratively make use of the central resource 434 based on a predetermined algorithm that implements one or more resource management approaches. Examples of such resource management approaches include, but are not limited to, round robin, first in first out, a weighted average importance methodology, and so forth for controlling, managing, accessing, or using the central resource 4 or the central resource functioning on behalf of a particular device.

The mobile device (e.g., smartphone 406) and/or the baggage sorter can communicate with the central resource 434 in a web-enabled manner and can be supported by a cloud-type local resource supported by one or more physical devices, such as server(s) (not shown) or the mobile devices themselves. Data communication may use hypertext transfer protocol (HTTP) or hypertext transfer protocol secure or hypertext secure sockets (both are referenced as HTTPS). In implementations, extensible hypertext markup language (XHTML) is used to communicate or present information. Other standards can be implemented, such as extensible markup language (xml), in conjunction with or separate from public key encryption (PKI) used to encrypt the data for communication or storage. In embodiments, the mobile device/baggage sorter and central resource communicate in a client-host arrangement.

As illustrated, for interactions involving the central resource 434 and resources such as the biometric information resource 460, passenger information system 470, and airline ticketing resource 480, the central resource 434 can function as a hub in a hub-and-spoke configuration with the resources supporting the central resource 434 that in-turn supports mobile device(s), baggage sorter(s), and so forth. The resources including the biometric information resource 460, passenger information system 470, and airline ticketing resource 480, and can include other collection devices, other systems (e.g., common carrier reservation/check-in systems), computer systems operated by governments or law enforcement, quasi-government organizations (e.g., National Center for Missing and Exploited Children), and so forth. The central resource 434 can function in a variety of ways depending on the corresponding system/device with which it is interacting or receiving communication. The central resource 434, for instance, is configured to exchange information (as indicated by the arrows) with biometric information resource 460, passenger information system 470, airline ticketing resource 480 or other common carrier systems, while it handles different tasks for the mobile device(s), baggage sorter(s), and so on.

With particular focus on the central resource 434, the processor 410 for the central resource 434 includes a categorization module 418. The categorization module 418 represents functionality to accept information, generate records, match entry/exit records for individuals, verify information, and so forth. The categorization module 418 is supported by computer executable instructions, e.g., a program or script, which are constructed to enable the processor to perform the described task.

The categorization module 418 in embodiments is constructed to receive information from a variety of sources including, but not limited to, collection devices, other systems, and so forth. For example, the central resource 434 is constructed to save biographic, biometric, and/or travel information in a record 412 in a data structure such as database 414 in memory 416 for an individual that does not have a record. The foregoing occurs when, for instance, the individual enters the country for the first time.

In other instances, the categorization module 418 generates a record 412 on a per instance basis (e.g., each time an individual enters the country). Although biographic and biometric information may be associated with one another in a record 412, the categorization module 418 can be configured to separate the information or otherwise arrange it to promote rapid (e.g., relational) searching based on a particular criterion, criteria, or a design preference. For example, a record 412, to which the categorization module 418 stores the information for an individual, includes a link that directs access to the biometric information stored in a corresponding biometric information record.

Those of skill in the art will appreciate that the functionality and corresponding hardware/software described in conjunction with the information module 426A and the information module 426B can be included in the central resource 434 and/or the biometric information resource 460 for a substantially similar purpose and/or function in a substantially similar manner taking into account its incorporation in the central resource 434 or biometric information resource as appropriate. The information module 426A is illustrated in the central resource 434 and a similarly configured information module 426B is illustrated in the biometric information resource 460. Although the information module 426A is illustrated as being within the categorization module 418 (in part for ease of understanding), it is to be appreciated that the various sub-modules can be designed to be independent with more APIs used to permit the sub-modules to interact based on design preference. Those of skill in the art will appreciate that the arrangement, function, and inclusion of one or more "sub-modules" such as the management, identity, and geolocation modules as described in the system of FIG. 2B and mobile devices can be included, based on design preference with the respective module/sub-module functioning in accordance with the role associated with the device within which it is included or associated, e.g., categorization module 418 included in the central resource 434 functions as if it is a host or master (commensurate with the role of the central resource 434) rather than a client.

In implementations, the biometric information resource 460 functions as a dedicated or semi-dedicated resource for the central resource 434, a baggage sorter, or one or more mobile devices if, for example, they collectively perform the functions described in conjunction with the cloud service/local network 464 (e.g., operating as a cloud resource). In this manner, the central resource 434 "offloads" or instructs the biometric resource 460 to perform tasks related to an item or a passenger such as biometric matching, biometric exclusion, data storage, lockout, and so forth to the biometric information resource 460 in favor of comparatively higher-level management tasks. An example of the preceding is the central resource 434 delegating to the biometric information resource 460 the task of setting a record flag of an item in question, scan a corresponding image/hash from the record against a gallery maintained by the biometric information resource 460 (e.g., biometric records 466), call out to a third-party biometric data source (e.g., a database of missing/exploited persons such as the one operated by the Center for Missing and Exploited Children), and so forth.

As should be appreciated, a mobile device and/or baggage sorter may include functionality/modules (supported by hardware/software) to function in a manner as a module(s) of the central resource 434. In embodiments, a local computing resource is used, e.g., as a local part of the cloud service/local network 464, to categorize an item, such as preprocessing information for the central resource 434.

In instances, a subset of the biometric information is retained in the record 412, e.g., a part of the biographic information or a computational result that is indicative of the biometric information, e.g., a biometric signature, a hash of the biometric information. In the foregoing example, the biometric information resource 460 and/or the matching module 419 calculates the biometric signature based on collected biometric information, e.g., facial dimensions. A biometric signature can be used to promote rapid biometric matching for routine identification and categorization. In embodiments involving multiple records, the records can be linked via a unique identifier, such as a passport number, a session identifier, an assigned number, or the like. A biometric resource is constructed to perform biometric related tasks (e.g., biometric data storage, biometric matching, biometric exclusion) to free up central resource's processing and/or memory resources. While the biometric information resource 460 can perform such roles, it should be apparent that the central resource 434 can hash biometric information while the biometric information resource 460 handles other tasks, such as processing raw images, performing biometric matching and the like as contemplated by one of ordinary skill in the art. For example, the biometric information resource 460 maintains a more detailed hash in comparison to that of the central resource for use in situations where greater accuracy is requested.

For example, the database 414 and records 412 stored therein are structured to facilitate searching based on name, or other identifiable biographic information, e.g., eye color, tattoo description. The system does this by segregating some information in a record 412 (e.g., in a name record or entry record) from other information (e.g., the majority of an individual's biometric information), duplicating some information in a table (e.g., a lookup table), indexing information, and so on to increase efficiency relative to a system or database without such a feature. Biometric information or portions thereof can be handled in similar manners. In embodiments, information associated with a particular trait or traits, e.g., eye spacing, is used to aid in rapid general identification or elimination of possible matches, while other identification techniques (other traits, combinations of traits, behaviors, etc.) are used to promote accurate identification by confirming an individual's identity for use in categorization.

In embodiments, the approaches, techniques, algorithms, implemented by the categorization module 418 are tailored based on structure and/or database operating parameters. For example, the algorithm is configured to match an individual leaving with his/her entry record by matching a traveler's identity with his biographic and historical information in a particular order, for increased efficiency when categorizing the individual for a particular level of physical screening. For instance, the categorization module 418 can include the matching module 419, which can implement an algorithm that matches entry records based on the country that issued the passport in order to reduce the records to be searched before searching for a particular passport number. Accordingly, the country code can serve as a categorical threshold distinguishing two levels of categorization (e.g., include a physical pat down for individuals not from the United States). In another instance, the algorithm uses a unique identifier (e.g., a machine-readable barcode on a travel document) that points to a record to which a match is to be made. In the previous example, the matching module 419 attempts to make a match, e.g., match identities, based on the unique identifier before reviewing other records and/or lists or a database of individuals for which other procedures are to be employed. It is to be appreciated that biometric features may be similarly categorized to minimize the gallery used for matching or exclusion, thereby increasing efficiency of categorizing corresponding individuals and/or items for physical screening.

The categorization module 418 can be configured to operate in a variety of modes that are accessed responsive to operator input, e.g., a system manager configures the system to implement a higher accuracy level in comparison to standard operation or dynamically based on a variety of information factors. The central resource 434, for example, supports a GUI that is configured to accept user input to increase a certainty level, such as during a time of heightened security in comparison to normal operation. In the preceding instance to increase accuracy, the categorization module 418 matches additional information to increase certainty. The increased certainty can be used to adjust threshold level(s) between different categories in which an item is placed for physical screening. For example, the increased certainty level is used to achieve a higher confidence in a given item, which can allow more tolerance for relaxing a level of physical screening to be applied to the item associated with that higher confidence level. In other embodiments, different information or additional information can be used to increase certainty and/or confidence. For example, instead of performing a "standard" biometric match, that yields ninety-eight percent (98%) certainty, the categorization module 418 performs a more in-depth review that increases accuracy to ninety-nine point nine percent (99.9%) by matching more factors, matching to a greater degree of accuracy, combinations thereof and so forth, resulting in a corresponding increased level of confidence and physical screening category tolerance.

In other embodiments, the categorization module 418 dynamically alters, such as via an algorithm, how and/or what algorithm is used to confirm a match. For example, if it appears based on biographic information that an individual is to be subject to additional procedures, e.g., additional safety screening, the algorithm implements additional checks to heighten certainty that the individual or his/her information does correspond to an individual warranting this type of treatment. The foregoing is done in comparison to a situation in which the individual is not associated with additional procedures. In additional embodiments, the categorization module 418 is configured to alter how, what, and/or to what extent biometric information is used to identify an individual (or item). For example, an algorithm used by the central resource 434 applies a higher facial recognition standard to an individual associated with poor fingerprint image, such as a brick layer. Accordingly, the central resource 434 can avoid categorizing the brick layer into a more onerous physical screening process, due to obtaining a high level of confidence of the brick layer via facial recognition, which level of confidence would not usually correspond to an individual lacking readable fingerprints.

Example heightened checks, which can be used to adjust a threshold for categorizing items, comprise additional information matching, the use of different or more rigorously applied biometric identification algorithms (in comparison to that commonly implemented). For example, while the categorization module 418 implements a target matching algorithm to identify an individual who is not to enter the country, an identification algorithm is used to verify the individual is indeed the individual who is barred from the country. In other examples, the categorization module 418 dynamically lowers accuracy to a predetermined acceptable level in order to increase the number of individuals that can be screened, which can be accommodated by a corresponding adjustment in dynamic thresholding applied to those individuals for a corresponding physical screening process. The foregoing can be done in conjunction with applying a higher exclusion standard, e.g., applying a more rigorous standard that is more likely to associate a captured image with an image in gallery of excluded images.

In some instances, the categorization module 418 coordinates information for a current instance with historical information. For example, current information is married with historical information. In other instances, the categorization module 418 uses historical information as a check or validation on current information. The categorization module 418 can perform this check by comparing a particular piece of information (e.g., a unique identifier such as a passport number) or based on a combination of information. An example of the latter situation is combining a first or given name, a last or surname, with a date of birth, and/or other biographic information to determine what tasks to perform, e.g., obtain additional information, impose predefined procedures, deny access, and so on. The categorization module 418 in addition to or in place of the foregoing can also check the data to determine if it is valid, e.g., a birthdate is composed of a month, day, year in that order.

Other information can be stored in conjunction with at least some of the information (biographic, biometric, travel). For instance, the categorization module 418 includes a unique identifier (e.g., a record identifier, a session identifier) with the information. The categorization module 418 can include other information in the record as well. For example, the categorization module 418 includes one or more of a timestamp, a software version, algorithm configuration, and the like with the information comprising the record 412. This other information can be included directly or used as metadata to biographic, biometric, or travel information.

Memory 416 can be used to store information in a variety of ways or formats. For example, information for an item, whether obtained from a collection device, received in a manifest 442, or obtained from another system/resource, e.g., biometric information resource 460, passenger information system 470, and/or airline ticketing resource 480, can be stored in a record 412 that is generated when an item is identified as a candidate for a physical screening process. In other examples, information is stored in a name record that contains information for (potentially) multiple instances. A name record, for example, may contain information for multiple visits, e.g., multiple entries/exits for a particular item in addition to containing biographic information for the individual, if applicable to that item. Memory 416 can house other databases, e.g., a manifest 442 database configured to contain manifests 442 from common carriers. Memory 416 can house or contain other databases, tables (lookup tables) and so forth. For example, information for items meeting pre-specified criterion can be housed in a separate database or lookup table.

Other example databases 414 include a procedure database that details procedures, prompts, questions, additional information, and so on for use. For example, the central resource 434 includes an information database that details common information associated a geographical area (e.g., a departure city, country, state). The central resource 434 may use this database 414 to formulate queries designed to test against an item, e.g., asking whether an individual is aware of information that is commonly known for an area.

In embodiments, the central resource 434 maintains information associated with certain characteristics in a database 414 for comparison against information for items. An example of the foregoing is the categorization module 418, as part of receiving and/or storing information, uses a lookup table to determine whether information for an item matches or at least partially matches that contained in the table. For example, the categorization module 418 implements a script or other logic to determine whether the item is that of a type, or an individual's identity, which corresponds to a type of item or individual that is not permitted to use a particular form of transportation (e.g., the item is a weapon banned from airplanes, or the individual is identified as being listed on a no-fly list). In these examples, not only may the lookup table include information on items meeting a preselected criterion, but it can include colorable variations of the information. Example variations include alternative spellings, misspellings, aliases, date ranges such as for birthdates, variations in physical descriptors (e.g., brown for hazel eye color), combinations thereof, and so forth. While such checks have been described with respect to record creation, a substantially similar process can be used when matching information for an individual leaving with that of an entry record. Moreover, the categorization module can implement a matching algorithm, e.g., a graphical based algorithm, which accounts for variation in individual pieces of information.

Furthermore, while the preceding processes are described in conjunction with storing information, in some instances, information is stored in a record 412 and then compared to determine whether a match exists. For example, rather than delaying overall productivity, a server functioning as the central resource 434 temporarily stores information into an overstay database 415 and then reviews it in parallel rather than checking and storing the information in series.

Central resource 434 can retrieve any or all of the historical information associated with Nicholas previously obtained and stored for use when he travels. Example historical information includes known information regarding Nicholas, such as biographic information, e.g., name, date of birth, unique identifier (driver's license number), passport number, airline frequently flier number, redress number, known traveler number, reservation number and associated data including date, time, method of establishing the reservation and payment method, boarding pass number or machine readable information (e.g., 2D barcode), redress number, address, or the like. In embodiments, this information includes information associated with his contemporaneous travel plans (his upcoming flight) and/or historic information. The information can also identify any individuals that Nicholas indicated will be traveling on the same flight. Similar information regarding these travel companion can also be accessed.

Categorization module 418 determines a first traveler category corresponding to the threshold of intrusiveness applied for screening of Nicholas and his various items based on historical information retrieved by the computing resource 140. As discussed above in reference to FIG. 2A, an example set of category values can correspond to a Low, Medium, and High level of risk to be investigated from the scanning of the traveler and his items. Of course, a set of categories utilized in a scanning process can utilize any number of categories as needed to distinguish the various levels of intrusiveness that are applied as part of the screening of travelers and their items.

In embodiments, the central resource 434, e.g., the categorization module 418, validates information to ensure it is properly formatted (e.g., the information is valid), conducts an initial review of the information, or a combination thereof. In embodiments, the central resource 434 can perform validation, consistency checking, and/or constraint checking. In an embodiment, the categorization module 418 checks the information to determine whether it duplicates previously submitted information. The foregoing can be done by querying the database 414 based on one or more portions of the information. For example, the categorization module 418 may check a passport number against those in the system to identify someone attempting to use an altered passport, e.g., the passport has a valid passport number but the contained information is not accurate to the information upon which the passport was issued. Although validation is described in conjunction with the categorization module 418, in other instances the validation and/or initial review functionality is embodied as a validation module. Such a validation module is representative of functionality to validate information and supported by a program of instructions, e.g., implementation of a set of validation rules by the categorization module 418. For instance, the central resource 434 includes a validation script that executes to perform validation logic. Validation or initial review can be performed in a distributed manner, e.g., a collection device such as a mobile device and/or baggage sorter performs a portion of the task and the central resource 434 performs other portions or confirms the validation or review.

The central resource 434 and categorization module 418 can be configured to perform additional tasks. For example, periodically or upon request the central resource 434 is configured to check whether items corresponding to records 412 in a database 414 meet a predetermined criterion, e.g., an individual overstayed his/her visa, a bag is misrouted to the wrong area and remains ("overstays") in the wrong area. In instances like this, the categorization module 418 or another component of the central resource 434 checks records 412 containing information meeting the criterion, e.g., "overstay." In response, the central resource 434 creates or updates a database 414 with information from records 412 that meet the criteria and/or creates/updates a table or other data structure with links to records that meet the criterion. The central resource 434 can add information to the record 412 to indicate the record 412 meets the criterion. In addition to populating the overstay database 415 with information for overstayed items, the categorization module 418 may flag (e.g., set data in memory to indicate a status or condition of logically related data) the records 412 by including information in the record that shows the item has overstayed.

The biometric information resource 460, passenger information system 470, and airline ticketing resource 480 are shown to include similar features described above with reference to the central resource 434, with corresponding similar functionality and capability. For example, the biometric information resource 460 includes processor 428, communication unit 462, memory 430, database(s) 432, and (biometric) records 466. The passenger information system 470 includes processor 420, communication unit 472, memory 422, database(s) 424, and manifest 476. The airline ticketing resource 480 includes processor 436, communication unit 482, memory 438, database(s) 440, and ticketing records 486.

The biometric information resource 460, passenger information system 470, and airline ticketing resource 480 are shown specifically in FIG. 4, however, while a variety of devices, components, examples, and scenarios are described, multiple devices and components can be used and the various tasks can be handled among the components in a distributive manner, e.g., dividing up tasks, allocating user devices, and the like among the physical computing devices comprising the intermediate. Although only one central resource 434 is illustrated for simplicity, the system can include multiple devices and components with similar functionality or functionality that differs to permit that device/component to perform a particular task or role as described herein. It is to be appreciated, for example, multiple components of similar type can be included. For example, a collection device includes an image capture device for fingerprints and another for iris scanning.

It should be noted that while various structures and functions are described with respect to certain members within the environment, the functions and/or structures may be implemented by other members in the environment, e.g., the central resource 434 includes a validation module, even though not specifically illustrated in FIG. 4. For example, a mobile device includes a matching module to identify an item/individual. For example, instead of the central resource 434 matching an individual (such as through a combination of hardware/software constructed to perform the described features), matching is performed by the mobile device (e.g., smartphone 406) and/or baggage sorter 104 operated in a local environment of the cloud service/local network 464, e.g., a local network at the departure airport. In scenario such as this, the central resource 434 can preposition information in the local environment of the cloud service/local network 464 for use categorizing. In some examples, the central resource 434 prepositions biographic and biometric information associated with an item scheduled to depart the local environment.

As illustrated schematically through the use of arrows, the central resource 434 can preposition information collected from various other resources into the central resource 434, such as from the illustrated biometric information resource 460 (to preposition its biometric records 466), from the illustrated passenger information system 470 (to preposition its manifest 476), and from the airline ticketing resource 480 (to preposition its ticketing records 486). Such prepositioning can be accomplished at predetermined times to avoid surges, such as during late/early hours of typically low activity where bandwidth and server resources are not otherwise in high demand. In the illustrated example of FIG. 4, the central resource 434 has prepositioned a copy of a most recent in time manifest information 407 to the overstay database 415 of the central resource 434, which was obtained from the manifest 476 of the passenger information system 470. Other information, such as biometric records 466, ticketing records 486, and the like can be obtained by the central resource 434 from other resources.

Prepositioning can be done at various times, such as on a routine basis (e.g., 24 (twenty-four) hours ahead), or periods of low processing and/or low communication (e.g., overnight). Prepositioning of information may occur at discrete times. For example, biographic information and a hash of a facial image are sent at one time while an image of the individual is sent at another time. The foregoing may be done based on a variety of factors, such as data size, based on a predictive factor (inclement weather is forecast, and so on).

Processing, such as the categorization module 418 categorizing an item at a local level, can occur on a local computing resource or on the mobile device itself. For example, as will be described in additional detail below, the prepositioned information may be in a generic form so it is agnostic of one or more of the device, software, or algorithm used to capture or process the data, such as a biometric signature, e.g., positions of "key" facial features. In some examples, the data is agnostic of proprietary algorithms and/or data formats. In other instances, a module in the mobile device or baggage sorter can perform biometric matching in a proprietary format using generic data. If for example, a facial hash (or other information used for categorizing an item) is determined to be corrupt, underlying information, e.g., from a server on the cloud service/local network 464 or the central resource 434, can be retrieved for applying an algorithm to the historic information in order to attempt to categorize the item with an image captured contemporaneously from an item to be screened.

In some instances, a common carrier or a local environment, such as an airport authority or port authority, provides to and/or responds to requests for information to/from the central resource 434. A variety of information sources can provide additional and/or revised information for storage/processing by the central resource 434, whether initial or otherwise. Manifests and updates to manifest information may be provided by the passenger information system 470, and/or requested by the central resource 434, at various predetermined times prior to or commensurate with physical screening processes to permit efficient processing and/or communication of at least some of the information in the manifest. Information received and/or requested by the central resource 434 can include additional or revised information, including deleted or canceled information to a manifest 476, such as the most recent in time manifest information 407. A common carrier may provide information such as this on an ad hoc or a scheduled basis, to account for changes that occur after a manifest 476 is requested and/or sent, whether an initial, interim, or final manifest 476. Ad hoc communications can be sent based on dynamic timing. An example of the foregoing is a common carrier responsive to an indication that the central resource 434 has available processing and/or communication resources.

In an embodiment, the manifest information and, as applicable, additional or revised data is combined to prepopulate to a local environment, such as a server or cloud on the cloud service/local network 464. While an initial list may represent all, substantially all, or a significant portion (e.g., by data size or data type such as biographic information) of the biographic/biometric information that is to be provided to a local environment, in other instances it may be a portion of the information. The initial list may include, for example, some biographic information with all, substantially all, or a significant portion (e.g., by data size) of the biometric information to be provided for matching individuals.

In embodiments, the initial list is prepositioned for use in a local environment prior to anticipated usage. For example, the central resource 434 communicates at least some biographic information, biometric information, or combinations thereof to a local environment resource on the cloud service/local network 464. In the previous example, the local environment includes a computing resource or a virtualized resource, such as one or more servers that support, for example, a destination airport. The initial list may include the available biometric information, biographic information, or a combination thereof of information that is available for items that are to undergo physical screening processes for a given time period, associated with a particular aspect of travel/flight, or the like. For example, the list includes the biometric and relevant biographic information for passengers and items on a cruise ship. Example biometric information may include one or more of a historic image (e.g., passport photo), biometric facial measurements, an image of a traveler's fingerprint, information from a retina scan, and so on that can be used to bio-identify an individual.

In some embodiments, a list may also include instructions for the local resource (e.g., server, collection device) to follow. For example, the central resource 434, via the list of instructions, instructs a device to implement a higher screening threshold, collect additional biometric information (e.g., capture all fingerprints, a palm print), ask for biographic information, require additional screening, check for contraband, and so forth.

In embodiments, an initial list is communicated at various points in time prior to the physical screening process. For example, the central resource 434 sends the local resource the initial list 24 (twenty-four) hours prior, approximately 24 (twenty-four) hours prior, or based on one or more of processing resource or communication link availability at or near a predetermined time. In an additional example, an initial list is processed 24 (twenty-four) hours prior to departure, but the information is not communicated until 20 (twenty) hours prior to departure to avoid overwhelming communication links, local resources, based on another priority (e.g., number of individuals on a flight), or combinations thereof.

Prepositioning information, such as by communicating and receiving an initial list to a local environment can result in the information being populated to memory associated with a local environment of the cloud service/local network 464. For instance, information included in the initial list is used to populate a local database that supports a particular airport or collection of airports. This permits the system to position information based on allocable system resources. The foregoing may speed local processing/identification as communication and central processing delays are avoided.

The central resource 434 and/or local resource(s) of the cloud service/local network 464 may use a dataset including biographic and/or biometric information, such as from biometric information resource 460, passenger information system 470, and/or airline ticketing resource 480 to categorize an item. Building a data set may occur similar to assembling information associated with an item during routine information handling. This can include encrypting and/or packetizing the data for communication.

In embodiments, the request and/or information to be provided is subject to various processes (e.g., validation, integrity checks) as part of a dataset build process. In some instances, the dataset build process implements additional procedures based on a variety of factors. Example factors include, but are not limited to, type of travel, time to anticipated departure, departure location, destination location, and factors associated with other individuals/items traveling on the vehicle.

In an embodiment, the encrypted and packetized dataset is communicated to the cloud service/local network 464, e.g., a server or cloud service supporting a departure airport. The communication can occur at a predetermined time, based on the prioritization established when the expedited request was received, as resources are available, on a first-in-first-out basis, or based on other factors, such as local resources, security parameters, travel plans of the individual or vehicle on which the individual is to travel, potential disruption to a common carrier, or the like.

Information in an expedited dataset can be used to populate a database in a local environment of the cloud service/local network 464. For example, the information is used by the local server to build a name record that generally mirrors that of the central resource 434. It should be appreciated that the record on the local resource of the cloud service/local network 464 may not include the extent of information that is stored in memory in association with the central resource 434. For example, the central resource 434 includes additional information, like information associated with a previous trip taken by the individual, or previous routing of a luggage item.

Additionally, the local resource of the cloud service/local network 464 can accept changes to information that is promulgated back to the central resource 434 at a predetermined time or on the occurrence of an event, e.g., availability of resources. For example, in response to submission of an address change, but for an individual whose information otherwise meets a predetermined threshold, the updated information for the individual and his/her associated items is communicated to the central resource 434 for inclusion in the database. In another example, an individual's facial image or facial recognition information is automatically added to the record 412 of the central resource 434 to better identify a passport held as he/she ages for the period of time his/her passport is valid. In this way, so long as a child/young adult makes use of a system employing the method his/her passport life may be extended with the provision that entry/exit is limited to times when updated images or facial recognition information are available.

In embodiments, central resource 434 and/or a local resource (a local server, collection devices, etc. on the of the cloud service/local network 464) can set a flag on, for example, a name/label record including one or more pieces of information for a specific individual/item. For example, the central resource 434 sets a flag on a record 412 that is being released (e.g., used) to a local resource of the cloud service/local network 464. In this manner, the flag is in place until the local resource of the cloud service/local network 464 releases the flag or the central resource 434 does so on its behalf, e.g., if no other local resources can make use of the name record. Thus, if for some reason the local resource of the cloud service/local network 464 loses communication with the central resource 434, the system (via the flag) ensures that record 412 cannot be reused while communication is unavailable. The local resource of the cloud service/local network 464 that sets the flag can use the information included in the initial list from the record to match an item to its information as reflected in the record 412 on the central resource 434. Such a decision may be a provisional decision that is electronically ratified once communication is reestablished with the central resource 434. The local resource of the cloud service/local network 464 and central resource 434 can reconcile their information once communication is restored or thereafter based on factors including priority, communication and processing resources, and the like. In other instances, upon a communication lapse between the central resource 434 and the local resource 464 that has been populated with information, the local resource of the cloud service/local network 464 (server, collection device, and so on) is programmed to not categorize an individual until communication is reestablished or it may do so provisionally.

The central resource 434 can generate a final database record that includes information from the various resources and categorization processes. The final database record may identify information for items that are, e.g., traveling on a particular vehicle, associated with a particular flight, etc. In some embodiments, in addition to identifying those people and items that were loaded, the database 414 includes a final version of the manifest 442 that includes, or the information generated during screening is otherwise associated with, the manifest 442 and/or an item associated with the manifest 442. For example, facial recognition information for a lap infant is associated with the individual with whom the infant is traveling, e.g., the parent or legal guardian. Thus, the database 414 can include relational information from screening and/or the mode of travel (flight) can be associated with the item. An example of the latter information is information that associated an item with screening or travel information that is not directly associated with the item itself. In the illustrated embodiment, the cloud service electronically communicates final record, or data composing at least a portion of a record, to the central resource 434 as part of a closeout procedure with the central resource 434. The central resource 434 can release the flag as part of this or responsive successful closeout.

The various network 120, network 220, cloud service/local network 464, as illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown in FIG. 1A (or in other figures), the network 120 can be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

CONCLUSION

Certain attributes, functions, steps of methods, or sub-steps of methods described herein are associate with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware and/or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. Although headings are used for the convenience of the reader, these are not be taken as limiting or restricting the systems, techniques, approaches, methods, devices to those appearing in any particular section. Rather, the teachings and disclosures herein can be combined, rearranged, with other portions of this disclosure and the knowledge of one of ordinary skill in the art. It is the intention of this disclosure to encompass and include such variation.

What is claimed is:

1. A system for configuring and routing within a physical screening process, comprising:
    a network, configured to interface with electronic devices, the electronic devices including a mobile device and including electronic devices of the physical screening process; and
    a computing resource that is connected to the network and includes a processor and, communicatively coupled to the processor, a communication unit and a tangible non-transitory computer-readable storage media embodying computer-readable instructions that are executable by the processor, including instructions that cause the processor, responsive to a received information, received via the network, related to an item or related to an individual associated with the item, or both, to:
        determine based on the received information which category among a plurality of different categories is a category that corresponds to the item, the different categories corresponding respectively to different thresholds applied in the physical screening process, and
        electronically communicate to the electronic device, via the communication unit and the network, an information for the category that corresponds to the item with instructions readable by the electronic device and cause the electronic device, responsive to receipt, to direct the item or to direct the individual associated with the item to a physical screening process area that corresponds to the category, for screening the item in the physical screening process to the threshold associated with the category.

2. The system of claim 1, the computer-readable instructions further comprising instructions that cause the computing resource to:
    determine whether a dispositive information is present in the received information, the dispositive information being dispositive of the threshold or dispositive of the category that corresponds to the item and, in response to determining said dispositive information is present, to
assign the threshold or the category based on said dispositive information, and
communicate the threshold or the category, via the network, to one or more of the electronic devices of the physical screening process.

3. The system of claim 1, further comprising the instructions readable by the electronic device including instructions readable by the mobile device and configured to cause the mobile device, upon receipt, to output on a display of the mobile device a visual representation of the physical screening process area.

4. The system of claim 3, further comprising the instructions readable by the mobile device including instructions that cause the mobile device to:
display, on the display of the mobile device, a map that indicates a current location of the mobile device and the location of the physical screening process area, or display a step-by-step instructions for reaching the physical screening process area from the current location of the mobile device, or both.

5. The system claim 4, further comprising the map including a representation of a path between the current location and the physical screening process area.

6. The system of claim 3, further comprising the instructions readable by the mobile device including step-by-step instructions from a current location of the mobile device to the physical screening process area and instructions that cause the mobile device to communicate the step-by-step instructions to a user of the mobile device.

7. The system of claim 3, further comprising the instructions readable by the mobile device including instructions that cause the mobile device to ascertain its current location and plot a representation, on a map on the display of the mobile device, of the current location and the physical screening process area.

8. The system of claim 7, further comprising:
a wireless beacon, communicatively connected to the computing resource via the network,
the wireless beacon being configured to be usable by the mobile device to:
ascertain the mobile device's location, and
provide a response to the computing resource, the response including information usable verify the mobile device's presence in a predetermined area.

9. The system of claim 1, the system further comprising:
a baggage sorter being among the electronic devices of the physical screening process;
the computer-readable instructions further including instructions that cause the computing resource to communicate to the baggage sorter, via the network, an information indicating the physical screening area; and
the baggage sorter being configured to:
scan machine-readable information that includes a unique identifier that uniquely identifies the item, and
route the item, based on the machine-readable information, to the physical screening process area.

10. The system of claim 9, further comprising the unique identifier being associated with the individual who is associated with the item.

11. The system of claim 1, further comprising the computer-readable instructions further including instructions that cause the computing resource to:

identify additional information about the item based on at least a portion of an outcome of the physical screening process;
responsive to said identified additional information, assign an other category to the item or to an other item associated with the item, based at least partially on the outcome of the physical screening process; and
electronically communicate information for the other category to the mobile device or an other mobile device, configured to direct the item or the other item responsive to receipt of the information for the other category, to an other area that corresponds to the other category for a subsequent physical screening process to a threshold associated with the other category.

12. The system of claim 11, further comprising the other category and its associated threshold representing a higher security level, relative to the category and its associated threshold, to be applied in the subsequent physical screening process.

13. The system of claim 11, further comprising the additional information including a total number of items, including the item, that belong to a class.

14. The system of claim 1, further comprising the computer-readable instructions further including instructions that cause the computing resource to:
calculate an amount of time for the physical screening process, and
change a setting of a device implemented in the physical screening process, responsive to the calculated amount of time for the physical screening process exceeding a predetermined time.

15. The system of claim 14, further comprising the setting including a setting of an iris scanner, fingerprint scanner, palm print scanner, slap scanner, facial scanner, X-ray scanner, full-body scanner, voice print scanner, gait scanner, millimeter wave scanner, backscatter scanner, or infrared scanner, or any combination thereof.

16. The system of claim 1, further comprising the computer-readable instructions further including instructions that cause the computing resource system to:
calculate an anticipated amount of time for the item to pass through the physical screening process, and responsive to the calculated anticipated time exceeding a predetermined amount of time to:
generate an alternative configuration of physical resources implemented in the physical screening process and iterate said calculation to determine if the alternative configuration yields an anticipated amount of time that is within the predetermined time, and, in response to the anticipated amount of time for the alternative configuration being within the predetermined time to:
electronically communicate information that indicates a different area to the mobile device, the different area corresponding to the alternative configuration.

17. The system of claim 1, the system further comprising the computer-readable instructions further including instructions that cause the processor to determine the category that corresponds to the item further based on:
electronically populating a multi-variable category determination algorithm with multiple physical security related variables, the multi-variable category determination algorithm comprising a weighted summing of the multiple physical security related variables;
calculating a score, based on the weighted summing of the multiple physical security related variables; and determining, based at least in part on the score, the category that corresponds to the item.

18. The system of claim 17, further comprising the multi-variable category determination algorithm being further configured according to a Failure Modes, Effect, and Criticality Analysis (FMECA).

19. The system of claim 1, further comprising:
the computing resource being configured to support a cloud service for the mobile devices and for the electronic devices;
the cloud service being configured as a localized cloud service of an other cloud service; and
the other cloud service including a central resource that is connected, via the network, to the computing resource, the central resource including:
an other processor, and
connected to the other processor, an other tangible non-transitory computer-readable storage media embodying other computer-readable instructions that are executable by the other processor, including instructions that cause the other processor to:
request and receive, from a biometric information resource, biometric information related to an individual associated with the item, or to other individuals, or both, and
provide, via the network, the biometric information to a resource of the local cloud service.

20. The system of claim 19, further comprising: the resource of the local service including physical screening resources, and the providing being a prepositioning of the biometric information to the physical screening resources, the prepositioning being in accordance with a timing that corresponds to the individual, or the other individuals, or both, arriving at the physical screening resources.

21. A system for managing a physical screening process, comprising:
a network configured for interfacing with mobile devices and with electronic devices associated with the physical screening process;
means for receiving from the network an information related to an item and, in response, determining based on the information which category among a plurality of different categories is a category that corresponds to the item, the different categories corresponding respectively to different thresholds applied in the physical screening process; and
means for displaying on the mobile device an information directing a user of the mobile device to a physical screening process area that corresponds to the category, for a physical screening applying the threshold associated with the category.

* * * * *